US012623903B2

(12) United States Patent
Tsang et al.

(10) Patent No.: US 12,623,903 B2
(45) Date of Patent: May 12, 2026

(54) NUCLEAR REACTOR-BASED SYSTEMS, METHODS, AND DEVICES FOR ENERGY PRODUCTION AND CARBON DIOXIDE (CO₂) CAPTURE

(71) Applicant: NuScale Power, LLC, Corvallis, OR (US)

(72) Inventors: Francis Y. Tsang, Bellingham, WA (US); José N. Reyes, Jr., Corvallis, OR (US); Luis DePavia, Corvallis, OR (US)

(73) Assignee: NuScale Power, LLC, Corvallis, OR (US)

( * ) Notice: Subject to any disclaimer, the term of this patent is extended or adjusted under 35 U.S.C. 154(b) by 0 days.

(21) Appl. No.: 18/607,268

(22) Filed: Mar. 15, 2024

(65) Prior Publication Data

US 2025/0214835 A1     Jul. 3, 2025

Related U.S. Application Data

(60) Provisional application No. 63/625,284, filed on Jan. 26, 2024, provisional application No. 63/493,049, (Continued)

(51) Int. Cl.
$C01B\ 3/34$       (2006.01)
$C01B\ 32/40$     (2017.01)
(Continued)

(52) U.S. Cl.
CPC .............. *C01B 3/346* (2013.01); *C01B 32/40* (2017.08); *C01B 32/50* (2017.08); *G21D 9/00* (2013.01);
(Continued)

(58) Field of Classification Search
CPC ......... C01B 3/346; C01B 32/40; C01B 32/50; C01B 2203/0216; C01B 2203/061; C01B 2203/84; C01B 2203/86; C07C 31/04
See application file for complete search history.

(56) References Cited

U.S. PATENT DOCUMENTS 3,802,993 A     4/1974   von Fredersdorff et al.
2007/0084778 A1  4/2007   Girard et al.
(Continued)

FOREIGN PATENT DOCUMENTS

JP         2016224019 A   12/2016
WO    WO2022058125 A1   3/2022

OTHER PUBLICATIONS

Search Report and Written Opinion for International Application No. PCT/US2023/085859, mailed on Apr. 29, 2024, 13 pages.
(Continued)

*Primary Examiner* — Jafar F Parsa
(74) *Attorney, Agent, or Firm* — Lee & Hayes, P.C.

(57) ABSTRACT

An integrated energy system comprising a power plant configured to generate steam. The power plant can include a nuclear reactor and/or an electrical power generation system. A chemical products generation system can include a first reaction chamber receiving Sodium Formate (HCOONa) that, via insertion of a first portion of the steam at a first temperature, is decomposed into Sodium Oxalate ((COO)₂Na₂) and Hydrogen (H₂), the steam including super-heated steam. The chemical products generation system can include a second reaction chamber receiving the Sodium Oxalate ((COO)₂Na₂) that, via insertion of a second portion of the steam at a second temperature, is decomposed into Sodium Oxide (Na₂O), Carbon Monoxide (CO), and Carbon Dioxide (CO₂). A syngas generation system can be operably coupled to the chemical products generation system and configured to generate a combination of the Hydro-
(Continued)

gen ($H_2$), the Carbon Monoxide (CO), and/or the Carbon Dioxide ($CO_2$), and/or to generate syngas.

12 Claims, 12 Drawing Sheets

Related U.S. Application Data filed on Mar. 30, 2023, provisional application No. 63/453,032, filed on Mar. 17, 2023.

(51) Int. Cl.
*C01B 32/50*    (2017.01)
*G21D 9/00*    (2006.01)

(52) U.S. Cl.
CPC    *C01B 2203/0216* (2013.01); *C01B 2203/061* (2013.01); *C01B 2203/84* (2013.01); *C01B 2203/86* (2013.01)

(56)    References Cited

U.S. PATENT DOCUMENTS

| | | |
|---|---|---|
| 2007/0217995 A1 | 9/2007 | Matsumura |
| 2010/0205856 A1 | 8/2010 | Kubic et al. |
| 2010/0260653 A1 | 10/2010 | Jones |
| 2011/0068575 A1 | 3/2011 | Zabtcioglu |
| 2011/0100006 A1 | 5/2011 | No et al. |
| 2011/0198085 A1 | 8/2011 | Thomas et al. |
| 2011/0200158 A1 | 8/2011 | Hyde et al. |
| 2012/0039430 A1 | 2/2012 | Abel |
| 2013/0281553 A1 | 10/2013 | Kubic et al. |
| 2014/0010743 A1 | 1/2014 | Kosmoski et al. |
| 2021/0082591 A1 | 3/2021 | Cella |
| 2021/0110940 A1 | 4/2021 | Frederick et al. |
| 2022/0251455 A1 | 8/2022 | Schuetzle et al. |
| 2022/0274063 A1 | 9/2022 | Dehlsen |
| 2022/0274907 A1 | 9/2022 | Novek |
| 2023/0287583 A1 | 9/2023 | Francis |
| 2024/0246023 A1 | 7/2024 | Tsang et al. |
| 2024/0409483 A1 | 12/2024 | Tsang et al. |
| 2025/0206604 A1 | 6/2025 | Tsang et al. |
| 2025/0206605 A1 | 6/2025 | Tsang et al. |
| 2025/0243139 A1 | 7/2025 | Tsang et al. |

OTHER PUBLICATIONS

Search Report and Written Opinion for International Application No. PCT/US23/76916, mailed Mar. 4, 202, 10 pages.
Search Report and Written Opinion for International Application No. PCT/US2023/012156, mailed Jul. 31, 2023, 11 pages.
Search Report and Written Opinion for International Application No. PCT/US2024/020300, mailed Jul. 18, 2024, 10 pages.
Arvanitidis, "Nuclear Driven Integrated Energy Systems: A State-of-the Art Review", Energies, vol. 16, No. 4293, May 24, 2023, 23 pages.
International Search Report and Written Opinion for International Application No. PCT/US2025/12967, dated Dec. 3, 2025, 10 pages.
Schuler, et al., "Formate as a key intermediate in CO2 utilization", Green Chemistry, vol. 24, Aug. 5, 2022, pp. 8227-8258.

100

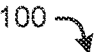

HYDROGEN          CHLORINE
(H₂)              (CL₂)
                  POWER

POWER → POWER PLANT SYSTEM 102

WATER ← WATER TREATMENT (DESALINATION) SYSTEM 104

STEAM →

POWER →

BRINE (NACL) → BRINE PROCESSING SYSTEM 105

WATER →

POWER GRID 114

WATER

STEAM

POWER

CARBON DIOXIDE (CO₂)

SODIUM HYDROXIDE (NAOH)

DIRECT AIR CAPTURE (DAC) SYSTEM 106 ← AIR

SODIUM CARBONATE (NA₂CO₃)

SYNGAS STORAGE 112 ← SYNGAS

SYNGAS PRODUCTION SYSTEM 110

H₂   CO₂   CO

Syngas

SODIUM FORMATE PRODUCTION SYSTEM 108

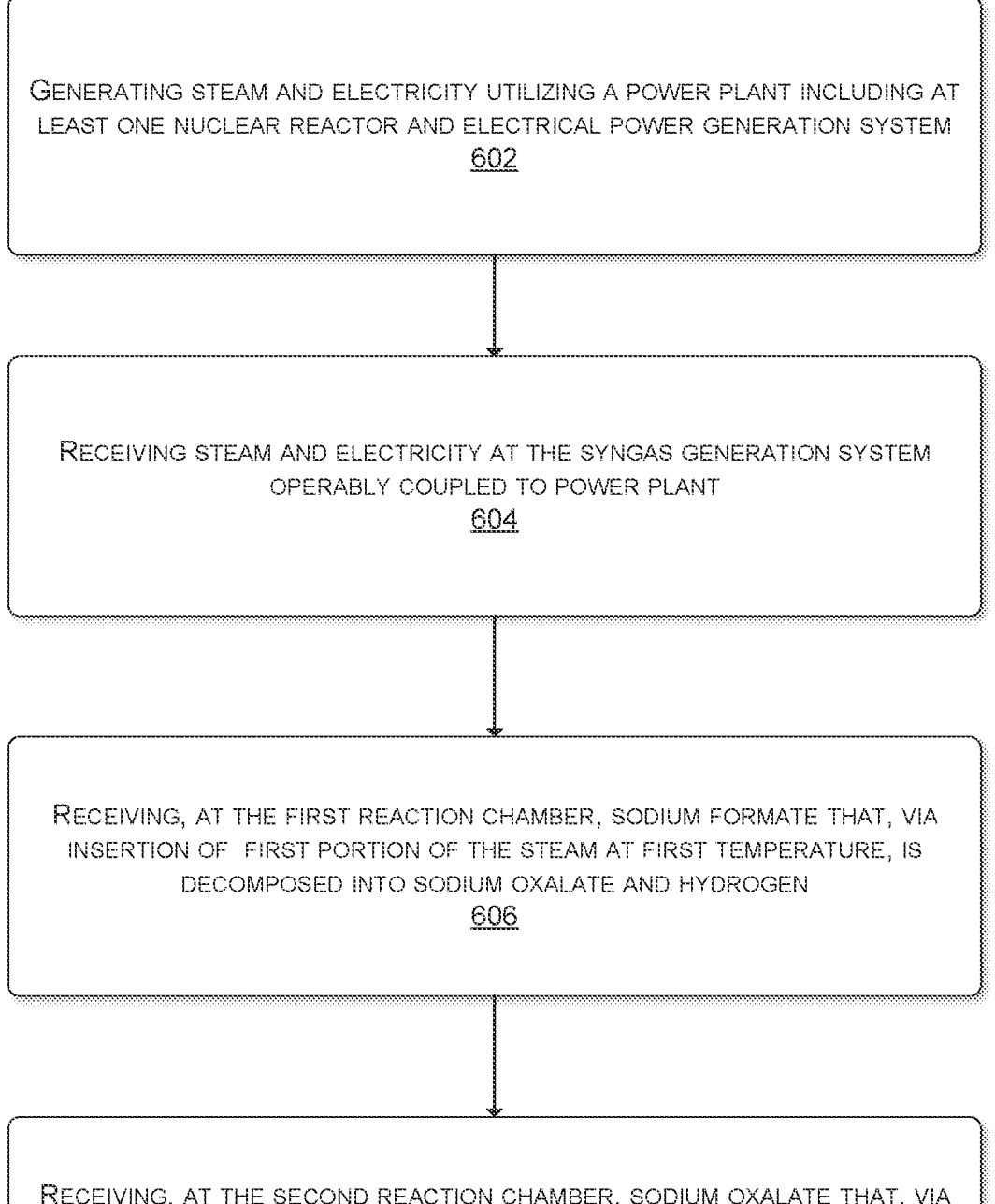

GENERATING STEAM AND ELECTRICITY UTILIZING A POWER PLANT INCLUDING AT LEAST ONE NUCLEAR REACTOR AND ELECTRICAL POWER GENERATION SYSTEM
602

RECEIVING STEAM AND ELECTRICITY AT THE SYNGAS GENERATION SYSTEM OPERABLY COUPLED TO POWER PLANT
604

RECEIVING, AT THE FIRST REACTION CHAMBER, SODIUM FORMATE THAT, VIA INSERTION OF FIRST PORTION OF THE STEAM AT FIRST TEMPERATURE, IS DECOMPOSED INTO SODIUM OXALATE AND HYDROGEN
606

RECEIVING, AT THE SECOND REACTION CHAMBER, SODIUM OXALATE THAT, VIA INSERTION OF SECOND PORTION OF STEAM AT SECOND TEMPERATURE, IS DECOMPOSED INTO SODIUM OXIDE, CARBON MONOXIDE, AND CARBON DIOXIDE
608

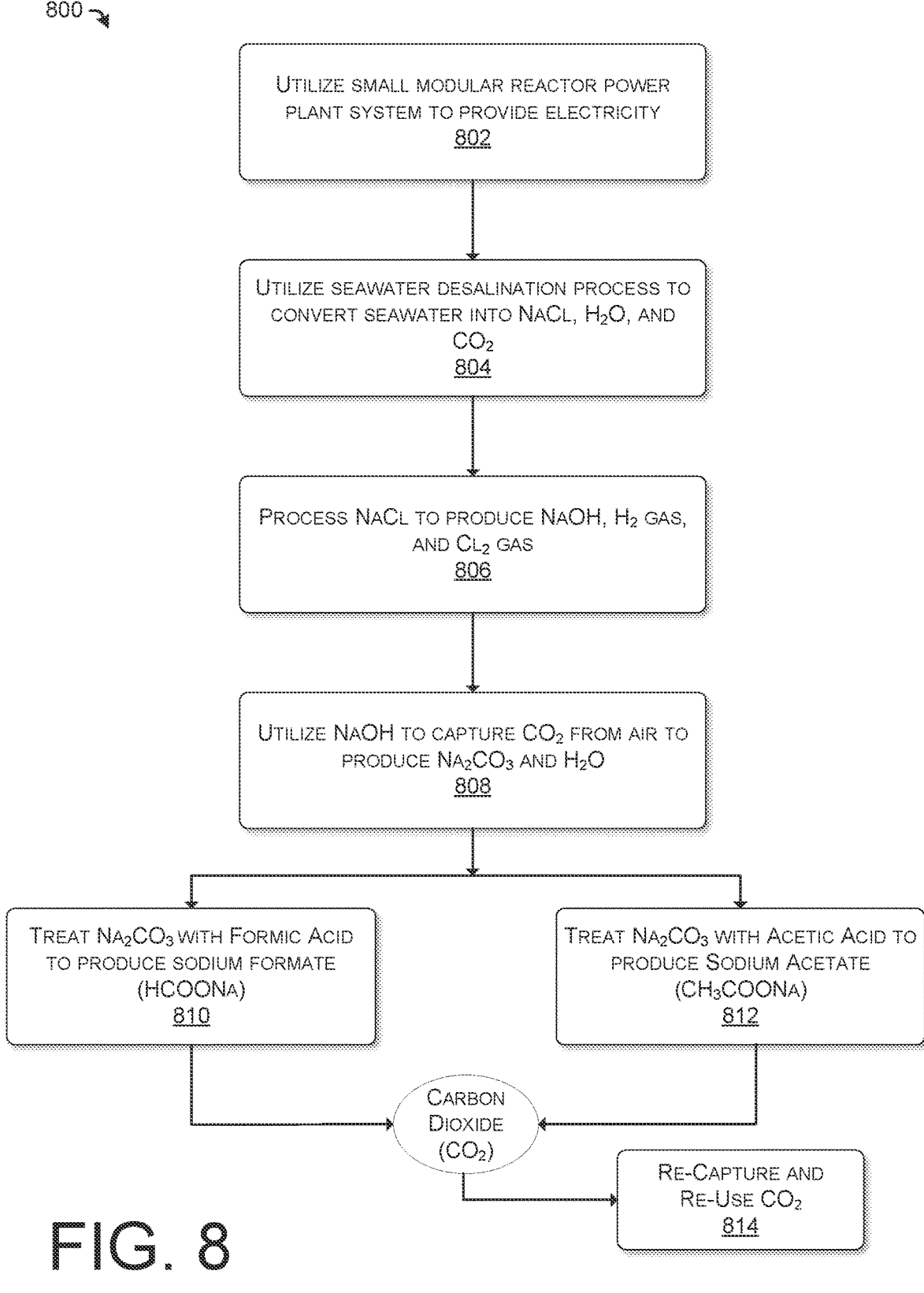

UTILIZE SMALL MODULAR REACTOR POWER
PLANT SYSTEM TO PROVIDE ELECTRICITY
802

UTILIZE SEAWATER DESALINATION PROCESS TO
CONVERT SEAWATER INTO NaCl, $H_2O$, AND
$CO_2$
804

PROCESS NaCl TO PRODUCE NaOH, $H_2$ GAS,
AND $Cl_2$ GAS
806

UTILIZE NaOH TO CAPTURE $CO_2$ FROM AIR TO
PRODUCE $Na_2CO_3$ AND $H_2O$
808

TREAT $Na_2CO_3$ WITH FORMIC ACID
TO PRODUCE SODIUM FORMATE
(HCOONa)
810

TREAT $Na_2CO_3$ WITH ACETIC ACID TO
PRODUCE SODIUM ACETATE
($CH_3COONa$)
812

CARBON
DIOXIDE
($CO_2$)

RE-CAPTURE AND
RE-USE $CO_2$
814

NUCLEAR REACTOR-BASED SYSTEMS, METHODS, AND DEVICES FOR ENERGY PRODUCTION AND CARBON DIOXIDE (CO₂) CAPTURE

CROSS-REFERENCE TO RELATED APPLICATIONS

This application claims the benefit of U.S. Provisional Patent Application No. 63/453,032 filed Mar. 17, 2023 and titled "SMALL MODULAR NUCLEAR REACTOR INTEGRATED ENERGY SYSTEMS FOR ENERGY PRODUCTION AND CO₂ PRODUCTION, AND ASSOCIATED DEVICES AND METHODS," to U.S. Provisional Patent Application No. 63/493,049, filed on Mar. 30, 2023 and titled "SYSTEMS, METHODS, AND DEVICES FOR CAPTURING CARBON DIOXIDE FROM THE ATMOSPHERE USING SODIUM HYDROXIDE," and to U.S. Provisional Patent Application No. 63/625,284, filed on Jan. 26, 2024 and titled "DECOMPOSITION OF SODIUM FORMATE AND SODIUM OXALATE USING SUPERHEATED STEAM FROM NUCLEAR REACTOR SYSTEM FOR DIRECT IN-SITU METHANOL PRODUCTION," all three of which are incorporated herein by reference in their entirety.

BACKGROUND

Various sources may be utilized to capture Carbon Dioxide ($CO_2$) in various ways. Resources, such as sorbents, can be utilized to bind with Carbon Dioxide ($CO_2$) in the air to capture the Carbon Dioxide ($CO_2$). The capturing of Carbon Dioxide ($CO_2$) may be accomplished before, during, or after combustion of fossil fuels, such as coal or natural gas. The capturing of Carbon Dioxide ($CO_2$) being accomplished before combustion of fossil fuels may include capturing Carbon Dioxide ($CO_2$) before the fossil fuels are gasified, such as to produce synthesis gas (syngas). The capturing of Carbon Dioxide ($CO_2$) may be accomplished after combustion processes are performed. The capturing of Carbon Dioxide ($CO_2$) after performance of combustion processes may include capturing Carbon Dioxide ($CO_2$) from exhaust gases of power plants and industrial facilities after performance of the combustion process.

Captured Carbon Dioxide ($CO_2$) may be utilized in various ways. The captured Carbon Dioxide ($CO_2$) may be utilized in chemical production processes, such as to provide chemicals, metals, and polymers. The Carbon Dioxide ($CO_2$) being captured in the air may be utilized in attempts to lower the concentration of Carbon Dioxide ($CO_2$) in the atmosphere globally, to offset the result of the continuous use of carbon-rich fossil fuels like coal, oil, and natural gas (Methane ($CH_4$)). The rising atmospheric Carbon Dioxide ($CO_2$) concentration is projected to be between 530-980 parts per million (ppm) in the year 2100, possibly doubling the current level of 410 ppm and far higher than the preindustrial level of 280 ppm. Lowering the concentration of Carbon Dioxide ($CO_2$) in the atmosphere may result in smaller amounts of radiated heat being reflected back to the Earth's surface, which may lower levels of Carbon Dioxide ($CO_2$) that react with ocean water molecules and, consequentially, lower levels of ocean acidification. The captured Carbon Dioxide ($CO_2$) may be utilized in industrial processes, such as with the captured Carbon Dioxide ($CO_2$) being used as a shielding gas in welding. The captured Carbon Dioxide ($CO_2$) may be utilized in enhanced oil recovery (EOR) processes, such as with the captured Carbon Dioxide ($CO_2$) being injected into reservoirs of depleted wells and utilized to extract oil.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

FIG. 1 schematically illustrates a representation of an integrated energy system 100 that includes a Small Modular Nuclear Reactor (SMR) system integrated with a chemical production system.

FIG. 6 illustrates a flowchart describing an example process for utilizing an integrated Small Modular Nuclear Reactor (SMR) system to continuously and simultaneously generate Hydrogen ($H_2$), Carbon Monoxide (CO), and Carbon Dioxide ($CO_2$) for Methanol ($CH_3OH$) production.

FIG. 8 illustrates a flow diagram of an example process for utilizing a small modular reactor plant system to capture Carbon Dioxide ($CO_2$) using a Direct Air Capture (DAC) process.

DETAILED DESCRIPTION

Overview

Figure 2:
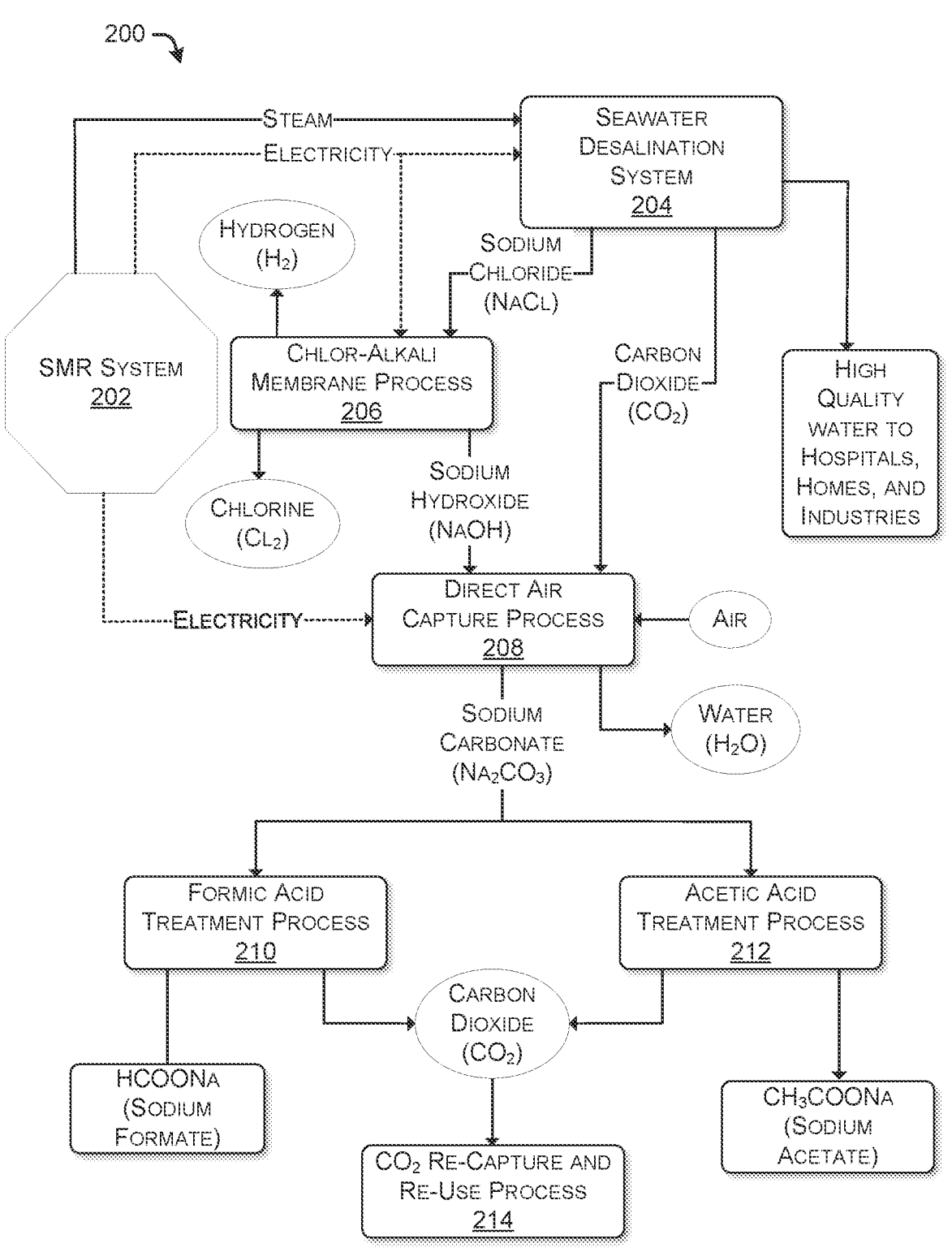
FIG. 2 illustrates a flow diagram of an example process associated with a Carbon Dioxide ($CO_2$) capturing process that yields carbon-free production of Sodium Formate (HCOONa) and Sodium Acetate ($CH_3COONa$).

This disclosure is directed to a self-contained and fully integrated Carbon Dioxide ($CO_2$) capturing process that yields carbon-free emissions to produce syngas. The Carbon Dioxide ($CO_2$) capturing process can be performed utilizing a nuclear power plant system, such as a Small Modular Nuclear Reactor (SMR) power plant system. For example, the nuclear plant system can be utilized to perform an integrated Carbon Dioxide ($CO_2$) capturing process that yields carbon-free emissions. The nuclear power plant system can be utilized to perform the Carbon Dioxide ($CO_2$) capturing from bulk plastic wastes.

The nuclear power plant system can be utilized by a Direct Air Capture (DAC) system to capture Carbon Dioxide ($CO_2$) from the atmosphere. For example, the nuclear power plant system can be configured to utilize fully integrated and interconnected sub-systems in order to capture Carbon Dioxide ($CO_2$) from the atmosphere while yielding carbon-free emissions. The nuclear power plant system can be configured to utilize fully integrated and interconnected sub-systems in order to regenerate and process captured Carbon Dioxide ($CO_2$). The nuclear power plant system can be configured to utilize fully integrated and interconnected sub-systems in order to process the by-products of capturing Carbon Dioxide ($CO_2$) from the atmosphere and yielding carbon-free emissions. The nuclear power plant system can be configured to utilize fully integrated and interconnected sub-systems in order to re-capture and process Carbon Dioxide ($CO_2$) released during operations.

In an embodiment, the SMR system may include a modular multi-reactor plant energy system (e.g., a 12-reactor system, a 6-reactor system, a 4-reactor system, a reactor system with any other number of reactors, etc.). In an embodiment, the small modular reactor power plant system may include one or more modular pressurized water reactors. In an embodiment, the small modular reactor power plant system may include an energy integration system that dynamically controls distribution of power plant steam.

In an embodiment, an energy integration system may dynamically control the distribution of power plant steam to various systems, components, and/or processes in order to regulate energy distribution.

In an embodiment, the SMR system may include an electrical power conversion system. In an embodiment, the electrical power conversion system may be configured to convert steam into electrical power and may distribute electrical power to an electrical power distribution system. In an embodiment, an electrical power distribution system may direct electrical power to one or more systems, components, or processes as required.

In an embodiment, the SMR system may include a steam transmission system. In an embodiment a steam transmission system may regulate the distribution of steam by directing steam flow or isolating steam flow to one or more components.

In an embodiment, the SMR system may include an electrical power grid. In an embodiment an electrical power grid may be an external power distribution system (e.g., a municipal power grid, etc.). In an embodiment, an SMR system may generate more electrical power (i.e., excess electricity) that is needed. In such embodiments, the excess electrical power may be transferred to an electrical power grid.

In an embodiment, the SMR system may include a nitrogen generator. In an embodiment, a nitrogen generator may be configured to capture Nitrogen ($N_2$) through various process (e.g., a Pressure Swing Adsorption (PSA) process, a membrane system, a cryogenic system, etc.).

In an embodiment, the SMR system may include a DAC plant. In an embodiment, the DAC plant may be configured to capture Carbon Dioxide ($CO_2$). In an embodiment, the DAC plant may be configured for Pressure Swing Adsorption operations.

In an embodiment, the SMR system may include a Hydrogen ($H_2$) and Oxygen ($O_2$) production plant. In an embodiment, a Hydrogen ($H_2$) and Oxygen ($O_2$) production plant may be configured to produce Hydrogen ($H_2$) and/or Oxygen ($O_2$) through a variety of methods (e.g., conduct a high temperature steam electrolysis process, a low temperature steam electrolysis process, a solid oxide electrolysis process, and a proton exchange membrane water electrolysis process, etc.). In an embodiment, a hydrogen fuel cell may be configured to convert Hydrogen ($H_2$) into electrical power.

In an embodiment, the SMR may include a water production plant. In an embodiment, a water production plant may be configured to produce brine and high-quality water for use in homes, hospitals, and industries. In an embodiment a water production plant may include a water treatment plant. In embodiments a water treatment plant may be configured to remove or isolate specific minerals or particles from water.

In an embodiment, the SMR system may include an oil refinery plant. In an embodiment, an oil refinery plant may be configured to desulfurize natural gas, fuel, petroleum, and other chemicals. In an embodiment, an oil refinery may be configured to refine petroleum into gasoline, diesel fuel, asphalt base, heating oil, fuel oil, kerosine, liquefied petroleum gas, petroleum naphtha, or other useful chemicals.

In an embodiment, the SMR system may include a chemical production plant. In an embodiment, a chemical production plant may be configured to produce Sodium Hydroxide (NaOH), Hydrochloric Acid (HCl), Ammonia ($NH_3$), Urea ($NH_2CONH_2$), Sulfuric Acid ($H_2SO_4$), or other useful chemicals.

In some embodiments, an integrated energy system may include a power plant system having multiple SMRs specifically configured to operate in unison to support one or more of the industrial processes. The SMRs may be, for example, nuclear reactors that are smaller in terms of size (e.g., dimensions). The SMRs may, for example, generate relatively comparable amounts of power as large, conventional nuclear reactors. Moreover, the SMRs may be modular in that some or all of their systems and components can be factory-assembled and transported as a unit to a location for installation. In some aspects of the present technology, the multiple SMRs of the integrated energy system can flexibly and dynamically provide electricity, steam, or a combination of both electricity and steam to the industrial processes due to the modularity and flexibility of the SMRs. That is, a configuration of the SMRs can be switched during operation to provide varying levels of steam and electricity output depending on the operational states and/or demands of the industrial processes.

Certain details are set forth in the following description and in FIGS. 1-11 to provide a thorough understanding of various embodiments of the present technology. In other instances, well known structures, materials, operations, and/ or systems often associated with nuclear reactors, power plant systems, integrated energy systems, chemical production plants, industrial process plants, electrolysis systems, Hydrogen ($H_2$) and Oxygen ($O_2$) production plants, Ammonia ($NH_3$) production plants, Nitric Acid ($HNO_3$) production plants, and the like, are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth. The terminology used below is to be interpreted in its broadest reasonable manner, even though it is being used in conjunction with a detailed description of certain examples of embodiments of the technology.

The accompanying Figures depict embodiments of the present technology and are not intended to limit its scope unless expressly indicated. The sizes of various depicted elements are not necessarily drawn to scale, and these various elements may be enlarged to improve legibility. Component details may be abstracted in the Figures to exclude details such as position of components and certain precise connections between such components when such details are unnecessary for a complete understanding of how to make and use the present technology. Many of the details, dimensions, angles, and other features shown in the Figures are merely illustrative of particular embodiments of the disclosure. Accordingly, other embodiments can have other details, dimensions, angles and features without departing from the present technology. In addition, those of ordinary skill in the art will appreciate that further embodiments of the present technology can be practiced without several of the details described below.

To the extent any materials incorporated herein by reference conflict with the present disclosure, the present disclosure controls. The headings provided herein are for convenience only and should not be construed as limiting the subject matter disclosed.

Illustrative Embodiments

FIG. 1 schematically illustrates a representation of an integrated energy system 100 that includes a Small Modular Nuclear Reactor (SMR) system integrated with a chemical production system. The energy system 100 may include a power plant system 102, a water treatment system (or "water treatment plant") 104, a Direct Air Capture (DAC) system (or "DAC plant") 106, a sodium formate production system (or "sodium formate production plant") 108, a syngas production system (or "syngas production plant") 110, syngas storage 112, and a power grid 114.

It is noted that the term syngas, as used herein, refers to synthesis gas including, but not limited to Hydrogen ($H_2$), Carbon Monoxide (CO), and Carbon Dioxide ($CO_2$). Alternatively, or additionally, the term syngas may alternatively refer to, for instance, any combination of Hydrogen ($H_2$), Carbon Monoxide (CO), and/or Carbon Dioxide ($CO_2$), and/or one or more other trace gases. In an embodiment, the syngas production system 110 may include processes that result with the production of Hydrogen ($H_2$), Carbon Monoxide (CO), and Carbon Dioxide ($CO_2$), including processes that produce chemicals or compounds in addition to syngas. For example, Sodium Formate (HCOONa) decomposes to produce Sodium Oxalate (($COO)_2Na_2$) and Hydrogen ($H_2$).

In the illustrated embodiment, the power plant system 102 can be configured for use in one or more industrial processes/operations and, more particularly, for use in resource production/recovery operations. The power plant system 102 can be located at or near the location of the syngas production system 110. For example, the power plant system 102 can be a permanent or temporary installation built at or near (e.g., roughly 1 km from) the location of the syngas production system 110 or can be a mobile or partially mobile system that is moved to and assembled at or near (e.g., within a threshold distance from) the location of the syngas production system 110. For example, the power plant system 102 can be moved to and assembled at or near any other portions of the integrated energy system 100.

In an embodiment, the power plant system 102 may include an SMR system (e.g., multi-module power plant design). However, in various instances, the power plant system 102 may represent any type of power plant system including any of various other types of nuclear reactors and/or nuclear reactor systems.

The power plant system 102 may be operably coupled to the water treatment system 104, the DAC system 106, the sodium formate production system 108, the syngas production system 110, the syngas storage component 112, and the power grid 114, and/or additional components for carrying out the resource production operation. The power plant system 102 can be referred to as a primary subsystem for carrying out the resource production operation. The water treatment system 104, the brine processing system 105, the DAC system 106, the sodium formate production system 108, the syngas production system 110, the syngas storage component 112, and the power grid 114 can be referred to as a secondary subsystem for carrying out a secondary process.

In embodiments, the power plant system 102 can be electrically coupled to the water treatment system 104, the brine processing system 105, the DAC system 106, the sodium formate production system 108, the syngas production system 110, the syngas storage component 112, and the power grid 114, for selectively providing electricity (e.g., power) thereto. Similarly, individual ones of steam output paths of the power plant system 102 can be fluidly coupled to the syngas production system 106 for selectively providing steam thereto. In other embodiments, the power plant system 102 can be operably coupled to additional or fewer outputs and/or the various outputs can receive electricity and/or steam from other sources (e.g., conventional steam suppliers, conventional electricity sources, etc.).

It is noted that the water treatment system 104 may perform one or more of various types of water treatment-related operations, such as seawater desalination (e.g., reverse osmosis distillation, flash-type boiling desalination, etc.), water purification, mineral filtration, chemical injection, particulate removal, and/or other process necessary to produce water at a desired specification. In embodiments, the water treatment system 104 may perform the water treatment-related operation(s) based on power received from the power plant system 102. The water treatment system 104 may receive the power (e.g., electricity) from the power plant system 102 via one or more of the electrical output paths from an electrical power transmission system of the power plant system 102. In embodiments, the water treatment system 104 may perform the water treatment operation(s) based on steam received from the power plant system 102 via a steam supplier (e.g., heat exchanger, steam generator, steam connection, etc.) from a steam transmission system of the power plant 102.

The water treatment system 104 may be the water treatment plant, a desalination plant (e.g., reverse osmosis, flash-type, etc.), and/or the like. The water treatment plant 104 may be configured to produce high quality water that can be provided to the power plant system 102 for use in power generation/cooling. For example, the water treatment plant 104 can operate to demineralize and/or otherwise remove contaminants and/or unwanted material from a water source. The water treatment plant 104 can route the produced high-quality water to the power plant system 102, which can use the water to produce power and/or a byproduct of high-quality steam. For example, the produced water can be used as a secondary coolant in a steam generator of one or more of the nuclear reactors. In some embodiments, the water treatment plant 104 can be omitted and the power plant system 102 can utilize water from other sources to generate steam.

The brine processing system 105 may be configured to receive brine and clean water from the water treatment system 104 and to process the brine to generate Chlorine ($Cl_2$), Hydrogen ($H_2$), and Sodium Hydroxide (NaOH). In some embodiments, the brine processing system 105 is configured to treat the brine using an electrolysis process, such as the Chlor-Alkali Membrane process, to produce Sodium Hydroxide (NaOH) from a solution of Sodium Chloride (NaCl). In some embodiments, the brine processing system 105 may be configured to remove impurities from the brine received from the water treatment system 104. For example, the brine may undergo precipitation and filtration to remove impurities.

The DAC plant 106 can receive electricity and steam from the power plant system 102, air from the atmosphere, Carbon Dioxide ($CO_2$) from the water treatment system 104, and utilize sodium hydroxide, electricity, and/or steam in a Direct Air Capture (DAC) process to generate (e.g., sequester, separate, capture) Carbon Dioxide ($CO_2$) in solution from the air. The integrated energy system 100 can include one or more post-processing plant(s) (e.g., sodium formate production system 108, etc.) positioned to receive the captured Carbon Dioxide ($CO_2$) in solution from the DAC plant 106 and to generate (e.g., release) Carbon Dioxide ($CO_2$) (e.g., in liquid, solid, and/or gaseous form) from the captured Carbon Dioxide ($CO_2$) in solution and/or to produce other useful chemicals. In some examples, during the pretreatment of seawater, dissolved Carbon Dioxide ($CO_2$) in the seawater may be released by the water treatment plant 104 and transported to the DAC system 106. Any Carbon Dioxide ($CO_2$) generated by the post-processing plant (e.g., the sodium formate production system 108) can be utilized to produce chemicals, bricks, plastic, bottles, etc., and/or can be stored (e.g., geologically). In some embodiments, the post-processing plant may utilize steam and/or electricity from the power plant system 102. The DAC plant 106 can carry out several different DAC processes and can, accordingly, have different configurations.

In an embodiment, the DAC plant 106 can carry out a liquid DAC process in which air containing Carbon Dioxide ($CO_2$) is passed through a liquid sorbent chemical solution to remove the Carbon Dioxide ($CO_2$). In an embodiment, a solid DAC process in which air containing Carbon Dioxide ($CO_2$) can be passed through a solid sorbent chemical filter to remove the Carbon Dioxide ($CO_2$). Both the liquid and solid DAC processes rely on two steps-first, the air is captured using an air contactor and second the liquid solvent (e.g., aqueous alkaline solutions) or solid sorbent (e.g., solid alkali carbonates, amine functionalized materials, metal organic frameworks (MOFs), zeolites, and/or the like) is regenerated while the captured Carbon Dioxide ($CO_2$) is generated for subsequent sequestration or for reuse to produce useful chemicals and/or materials. Specifically, in some embodiments the DAC plant 106 uses sodium hydroxide as a liquid sorbent for DAC. Accordingly, the captured Carbon Dioxide ($CO_2$) in solution can comprise Carbon Dioxide ($CO_2$) in solution with sodium hydroxide. In some embodiments, the DAC plant 106 and the post-processing plant can be integrated into a single plant. Accordingly, the DAC plant 106 and the post-processing plant can together be referred to as a "DAC plant." a "DAC and post-processing plant." and/or the like.

The sodium formate production system 108 can receive Sodium Carbonate ($Na_2CO_3$) solutions from the DAC system 106 and power from the power plant system 102 to generate Sodium Formate (HCOONa). The production of Sodium Formate (HCOONa) from Sodium Carbonate ($Na_2CO_3$), including chemical equations and explanations, is discussed in greater detail below regarding FIG. 2.

In embodiments, the power plant system 102 may provide steam, power, and water to the syngas production system 110. The syngas production system 110 may use the combination of steam and power to produce a specific resource (e.g., syngas). In such cases, the amount of steam and power provided to the syngas production system 110 may be catered to achieve a specified production level for the resource. For example, the amount of power, steam, and water directed to the syngas production system 110 may be an amount needed to produce a predetermined amount of the resource, such as syngas, which is then stored in the syngas storage 112. In some cases, steam provided by the power plant system 102 is condensed into liquid water during the resource production process (e.g., the process, such as the syngas production process, performed by the syngas production system 110) and subsequently returned to the power plant system 102 (in some cases via the water treatment plant 104).

In an embodiment, the syngas storage 112 may include one or more storage solutions (e.g., one or more vessels). The storage solutions of the syngas storage 112 may be utilized to segregate the syngas as required (e.g., a large holding tank, small portable tanks, a mobile tank, etc.).

It is noted that the power grid 114 may include a public or private power distribution system. For example, if the power plant system 102 produces excess electrical energy, the excess electricity may be distributed to the power grid 114 that is electrically coupled to the power plant system 102.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

FIG. 2 illustrates a flow diagram of an example process associated with a Carbon Dioxide ($CO_2$) capturing process that yields carbon-free production of Sodium Formate (HCOONa) and Sodium Acetate ($CH_3COONa$) 200 (herein after "carbon-capturing process 200"). The order in which the operations or steps are described is not intended to be construed as a limitation, and any number of the described operations or steps may be combined in any order and/or in parallel to implement the carbon-capturing process 200. In an embodiment, the carbon-capturing process 200 may include a Small Modular Nuclear Reactor (SMR) system 202 (herein after "SMR system 202"), a seawater desalination system 204, a Chlor-Alkali Membrane process 206, a DAC process 208, a formic acid treatment process 210, an Acetic Acid ($CH_3COOH$) treatment process, and a Carbon Dioxide ($CO_2$) re-capture and re-use process 214. In an embodiment, the SMR system 202 may include a modular multi-reactor plant energy system (e.g., a 12-reactor system, a 6-reactor system, a 4-reactor system, a reactor system with any other number of reactors, etc.). In an embodiment, the SMR system 202 depicted in FIG. 2 may be the same or similar to the power plant system 102 depicted in FIG. 1. For example, in an embodiment, the SMR system 202 depicted in FIG. 2 may be utilized to provide power and steam to the water treatment system 104, the brine processing system 105, and the syngas production system 106, as depicted in FIG. 1. Similarly, in an embodiment, the power plant system 102 depicted in FIG. 1 may be utilized to provide steam and electricity to the seawater desalination system 204, provide electricity to the chlor-alkali process 206 and provide power to the DAC process 208, as depicted in FIG. 2.

The carbon-capturing process 200 may include generating energy utilizing the SMR system 202. In an embodiment, the SMR system 202 may include one or more modular pressurized water reactors (e.g., multi-module power plant design). In an embodiment, the SMR system 202 may be dynamically controlled in real time to provide a stable and consistent source of energy for the processes and components as required during the carbon-capturing process 200.

The carbon-capturing process 200 may include a seawater desalination system 204. In an embodiment, the seawater desalination system 204 may include processing seawater to produce potable drinking water and brine (e.g., a concentrated Sodium Chloride (NaCl) solution). In an embodiment, seawater must be pre-treated prior to desalination, which may cause the release of Carbon Dioxide ($CO_2$). In these embodiments, the released Carbon Dioxide ($CO_2$) may be routed in other step(s) of the carbon-capturing process 200 (e.g., routed to the DAC process 208, etc.). In embodiments, the seawater desalination system 204 may produce high quality water for use in hospitals, homes, and industries.

The carbon-capturing process 200 may include a Chlor-Alkali Membrane process 206. In an embodiment, the chlor-alkali membrane process 206 may include processing brine to generate Sodium Hydroxide (NaOH). In an embodiment, processing Sodium Chloride (NaCl) to produce Sodium Hydroxide (NaOH) may also produce hydrogen gas and nitrogen gas. In an embodiment, hydrogen gas and nitrogen gas may be used individually or combined for further industrial processing (e.g., production of Ammonia ($NH_3$), production of Hydrochloric Acid (HCl), desulfurization to produce Sulfuric Acid ($H_2SO_4$), production of Urea ($NH_2CONH_2$), etc.). In embodiments, Sodium Hydroxide (NaOH) may be used as a capturing solution in the carbon-capturing process 200.

The carbon-capturing process 200 may include the DAC process 208. In an embodiment, the DAC process 208 may include routing air (e.g., atmospheric air drawn in from large fans, compressed air, Carbon Dioxide ($CO_2$) released during seawater desalination pre-treatment, etc.) into a contactor. In embodiments, Carbon Dioxide ($CO_2$) present in the air may interact with a capturing solution (e.g., Sodium Hydroxide (NaOH), etc.) to produce Sodium Carbonate ($Na_2CO_3$). In an embodiment, the Sodium Carbonate ($Na_2CO_3$) may be soluble and remain with the capturing solution, as expressed by an equation 1, shown below:

$$2NaOH + CO_2 \longrightarrow Na_2CO_3 + H_2O \tag{1}$$

where 2NaOH is two moles of sodium hydroxide (the carbon-dioxide capture solution), $CO_2$ is carbon dioxide within the air, $Na_2CO_3$ is the sodium carbonate created when the airborne carbon dioxide molecules bind with the sodium hydroxide capture solution, and $H_2O$ is created, along with the Sodium Carbonate ($Na_2CO_3$), when the airborne carbon dioxide molecules bind with the sodium hydroxide capture solution.

The carbon-capturing process 200 may include a formic acid treatment process 210. In an embodiment, a formic acid treatment process 210 may include adding Formic Acid (HCOOH) to the capturing solution to produce Sodium Formate (HCOONa) and release the captured Carbon Dioxide ($CO_2$) for future use, as represented by equations (e.g., reaction equations) 2 and 3, shown below:

$$HCOOH + NaOH \longrightarrow HCOONa + H_2O \tag{2}$$

$$2HCOOH + Na_2CO_3 \longrightarrow 2HCOONa + H_2O + CO_2 \tag{3}$$

where, in equation 2, HCOOH is formic acid being added to the carbon-dioxide capturing solution, NaOH is sodium hydroxide (the carbon-dioxide capture solution), HCOONa is sodium formate generated when the Formic Acid (HCOOH) reacts with the sodium hydroxide carbon-dioxide capturing solution, and $H_2O$ is water produced, along with the Sodium Formate (HCOONa), when the Formic Acid (HCOOH) reacts with the sodium hydroxide carbon-capturing solution, and where, in equation 3, HCOOH is formic acid being added to the sodium carbonate solution generated through direct air capture, $Na_2CO_3$ is the sodium carbonate generated through direct air capture, HCOONa is sodium formate created when the formic acid reacts with the Sodium Carbonate ($Na_2CO_3$), $H_2O$ is water generated, along with the Sodium Formate (HCOONa), when then formic acid reacts with the Sodium Carbonate ($Na_2CO_3$), and $CO_2$ is carbon dioxide generated, along with the Sodium Formate (HCOONa) and water, when the formic acid reacts with the Sodium Carbonate ($Na_2CO_3$).

In an embodiment, HCOONa may be fed into a first thermal decomposition chamber that utilizes super-heated steam from a NuScale VOYGR SMR to maintain a constant 350° C. in the first thermal decomposition chamber in order to maintain constant and continuous decomposition of the HCOONa. In such an embodiment, the HCOONa may be continuously decomposed into Sodium Oxalate (($COO)_2$ $Na_2$) and produce more Hydrogen ($H_2$), as demonstrated in an equation 4, shown below:

$$2HCOONa \longrightarrow (COO)_2Na_2 + H_2 \tag{4}$$

where 2HCOONa is two moles of sodium formate added into the first thermal decomposition chamber, $(COO)_2Na_2$ is sodium oxalate generated when the Sodium Formate (HCOONa) is heated in the first thermal decomposition chamber, and Hydrogen ($H_2$) is hydrogen gas generated, along with the Sodium Oxalate ($(COO)_2Na_2$), when the Sodium Formate (HCOONa) is heated in the first thermal decomposition chamber.

It is noted that continuous, as used herein and throughout this disclosure, is intended to be interpreted as continuing without interruption for any length of time as desired (e.g., one month, one year, ten years, 100 years, etc.). According to some implementations, production of the Methanol ($CH_3OH$) may start and be performed continuously, without interruption of the availability of any of the essential elements required to sustain the Methanol ($CH_3OH$) production, or with the Methanol ($CH_3OH$) production being interrupted (e.g., via a selection received via user input to a control system utilized to control any equipment associated with the Methanol ($CH_3OH$) production).

In an embodiment, the Sodium Oxalate ($(COO)_2Na_2$) may be directly fed from the first thermal decomposition chamber into a second thermal decomposition chamber. In such an embodiment, the second thermal decomposition chamber may utilize super-heated steam from a NuScale VOYGR SMR or compression heating to maintain a temperature of 800° C.+ in the second thermal decomposition chamber. In such an embodiment, the Sodium Oxalate ($(COO)_2Na_2$) may be continuously decomposed into Sodium Carbonate ($Na_2CO_3$) and Carbon Monoxide (CO), as demonstrated in an equation 5, shown below:

$$(COO)_2Na_2 \longrightarrow Na_2CO_3 + CO \tag{5}$$

where $(COO)_2Na_2$ is sodium oxalate added to the second thermal decomposition chamber, $Na_2CO_3$ is sodium carbonate that is generated when the sodium oxalate is heated in the second thermal decomposition chamber, and CO is carbon monoxide generated, along with the Sodium Carbonate ($Na_2CO_3$), when the sodium oxalate is heated in the second thermal decomposition chamber.

In an embodiment, the Sodium Carbonate ($Na_2CO_3$) can be hydrothermally (e.g., and continuously) decomposed into Sodium Oxide ($Na_2O$) and Carbon Dioxide ($CO_2$), as demonstrated in an equation 6, shown below:

$$Na_2CO_3 \longrightarrow Na_2O + CO_2 \tag{6}$$

where $Na_2CO_3$ is sodium carbonate is injected into the second thermal decomposition chamber, $Na_2O$ is sodium oxide generated when the Sodium Carbonate ($Na_2CO_3$) is hydrothermally decomposed in the second thermal decomposition chamber, and $CO_2$ is carbon dioxide generated, along with the Sodium Oxide ($Na_2O$), when the Sodium Carbonate ($Na_2CO_3$) is hydrothermally decomposed in the second thermal decomposition chamber.

In an embodiment, the formic acid treatment process 210 may include the continuous production of Sodium Formate (HCOONa) and the continuous decomposition of Sodium Formate (HCOONa) to provide the continuous production of Hydrogen ($H_2$), Carbon Monoxide (CO), and Carbon Dioxide ($CO_2$). In an embodiment, the continuous supply of Hydrogen ($H_2$), Carbon Monoxide (CO), and Carbon Dioxide ($CO_2$) may be collected, directed to a synthesis chamber, and used to continuously produce Methanol ($CH_3OH$).

In an embodiment, the formic acid treatment process 210 may be used to release (re-generate) captured Carbon Dioxide ($CO_2$) without requiring the high energy demand required for DAC processes. In an embodiment, the released (re-generated) Carbon Dioxide ($CO_2$) may be compressed, sequestrated, or re-used to generate useful materials that may retain the carbon molecules for years.

In an embodiment, Sodium Formate (HCOONa) may be heated to below 290° C. to produce Hydrogen ($H_2$) and Sodium Oxalate ($(COO)_2Na_2$). In an embodiment, heating the produced Sodium Oxalate ($(COO)_2Na_2$) to temperatures greater than 290° C. may produce Carbon Monoxide (CO) gas and Sodium Carbonate ($Na_2CO_3$). In embodiments, increasing the produced Sodium Oxalate ($(COO)_2Na_2$) to temperatures greater than 750° C. (e.g., utilizing super-heated steam for hydrothermal decomposition) may yield additional Hydrogen ($H_2$) and Sodium Carbonate ($Na_2CO_3$).

The carbon-capturing process 200 may include an Acetic Acid ($CH_3COOH$) treatment process 212. In an embodiment, an Acetic Acid ($CH_3COOH$) treatment process 212 may include adding Acetic Acid ($CH_3COOH$) to the capturing solution to produce Sodium Acetate ($CH_3COONa$) and release the captured Carbon Dioxide ($CO_2$) for future use, as represented by equations (e.g., reaction equations) 7 and 8, shown below:

$$CH_3COOH + NaOH \longrightarrow CH_3COONa + H_2O \tag{7}$$

$$2CH_3COOH + Na_2CO_3 \longrightarrow 2CH_3COONa + H_2O + CO_2 \tag{8}$$

where, in equation 7, $CH_3COOH$ is acetic acid being added to Sodium Carbonate ($Na_2CO_3$) for the Acetic Acid ($CH_3COOH$) treatment process, NaOH is sodium hydroxide (the carbon-dioxide capturing solution), $CH_3COONa$ is sodium acetate generated when the Acetic Acid ($CH_3COOH$) reacts with the sodium hydroxide carbon-dioxide capturing solution, and $H_2O$ is water generated, along with the Sodium Acetate ($CH_3COONa$), when the Acetic Acid ($CH_3COOH$) reacts with the sodium hydroxide carbon-dioxide capturing solution, and where, in equation 8, $CH_3COOH$ is acetic acid being added to Sodium Carbonate ($Na_2CO_3$) for the Acetic Acid ($CH_3COOH$) treatment process, $Na_2CO_3$ is sodium carbonate generated through direct air capture, $CH_3COONa$ is sodium acetate generated when the Acetic Acid ($CH_3COOH$) reacts with the Sodium Carbonate ($Na_2CO_3$), $H_2O$ is water generated, along with the Sodium Acetate ($CH_3COONa$), when the Acetic Acid ($CH_3COOH$) reacts with the Sodium Carbonate ($Na_2CO_3$), and $CO_2$ is carbon dioxide generated, along with Sodium Acetate ($CH_3COONa$) and water, when the Acetic Acid ($CH_3COOH$) reacts with the Sodium Carbonate ($Na_2CO_3$).

The Carbon Dioxide ($CO_2$) in equation 8 can include the captured Carbon Dioxide ($CO_2$) that is released. In an embodiment, the Acetic Acid ($CH_3COOH$) treatment process 212 may be used to release (re-generate) captured Carbon Dioxide ($CO_2$) without requiring the high energy demand required for DAC processes. In an embodiment, the released (re-generated) Carbon Dioxide ($CO_2$) may be compressed, sequestrated, or re-used to generate useful materials that may retain the carbon molecules for years.

In an embodiment, heating Sodium Acetate ($CH_3COONa$) to 330° C.-500° C. can generate Sodium Formate (HCOONa), Hydrogen ($H_2$), Carbon Dioxide ($CO_2$), and Methane gas ($CH_4$). In an embodiment, the produced Methane ($CH_4$) may be compressed and separated. In embodiments a steam-methane reforming process may be used to process the produce Methane (CH$_4$), to produce Carbon Dioxide (CO$_2$), and to regenerate more Hydrogen (H$_2$).

In an embodiment, the Carbon Dioxide (CO$_2$) produced when Sodium Acetate (CH$_3$COONa) is heated to 330° C.-500° C. and/or the Carbon Dioxide (CO$_2$) produced during a steam-methane reforming process may be recaptured (e.g., routed to the DAC process 208, etc.).

The carbon-capturing process 200 may include a Carbon Dioxide (CO$_2$) re-capture and re-use process 214. In an embodiment, the Carbon Dioxide (CO$_2$) re-capture and re-use process 214 may include routing Carbon Dioxide (CO$_2$) back through the carbon-capturing process 200 (e.g., routing the Carbon Dioxide (CO$_2$) to the DAC process 208, etc.). It is noted that the Carbon Dioxide (CO$_2$) re-capture and re-use process 214 is necessary to achieve yielding carbon-free emissions.

Figure 3A:
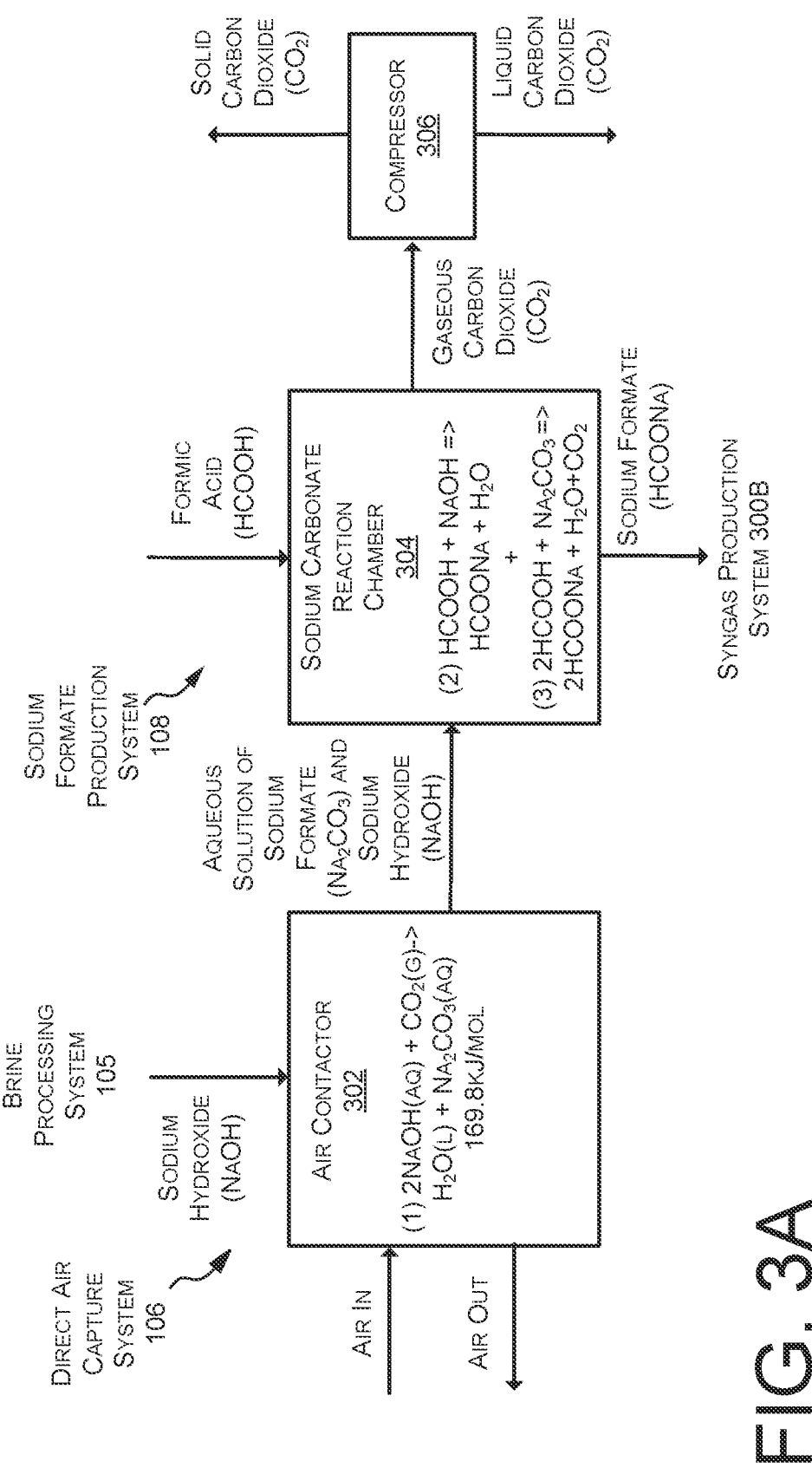
FIG. 3A is a schematic diagram of a production system, wherein the Direct Air Capture (DAC) system 106 of FIG. 1 is integrated with the sodium formate production system 108 of FIG. 1 and configured to produce solid Carbon Dioxide ($CO_2$) and liquid Carbon Dioxide ($CO_2$) in accordance with embodiments of the present technology.

FIG. 3A is a schematic diagram of a production system 300A, wherein the Direct Air Capture (DAC) system 106 of FIG. 1 is integrated with the sodium formate production system 108 of FIG. 1 and configured to produce solid Carbon Dioxide (CO$_2$) and liquid Carbon Dioxide (CO$_2$) in accordance with embodiments of the present technology. The DAC system 106 can include some features that are at least generally similar in structure and function, or identical in structure and function, to the corresponding features of the DAC plant 506 (described in detail below with reference to FIG. 5) and/or as described in example process 800 (described in detail below with reference to FIG. 8).

This application relates to U.S. Non-Provisional patent application Ser. No. 18/395,441, filed on Dec. 22, 2023, and titled "SMALL MODULAR NUCLEAR REACTOR INTEGRATED ENERGY SYSTEMS FOR CAPTURING ATMOSPHERIC CARBON DIOXIDE USING SODIUM HYDROXIDE," which is incorporated herein by reference.

In the illustrated embodiment, the production system 300A further includes a sodium carbonate reaction chamber 304 operably positioned between the air contactor 302 and the compressor 306. Each of the air contactor 302, the sodium carbonate reaction chamber 304, and the compressor 306 can operate using electricity and/or steam produced by the power plant system 102 (FIG. 1) and selectively routed to the DAC system 106, and/or via electrical and/or steam inputs from other energy sources.

As described in detail above, the air contactor 302 can receive Sodium Hydroxide (NaOH) from the Brine Processing System 105 and use the sodium hydroxide as a liquid sorbent to capture Carbon Dioxide (CO$_2$) from atmospheric air-outputting a solution of aqueous Sodium Carbonate (Na$_2$CO$_3$) and Sodium Hydroxide (NaOH) according to equation (1) above. In the illustrated embodiment, the sodium carbonate reaction chamber 304 is positioned to receive Formic Acid (HCOOH) and the aqueous solution of Sodium Carbonate (Na$_2$CO$_3$) and Sodium Hydroxide (NaOH), and is configured to react the formic acid with the solution to produce (e.g., release, generate, regenerate) gaseous Carbon Dioxide (CO$_2$) and Sodium Formate (HCOONa) according to equations (9) and (10) below:

$$\text{HCOOH} + \text{NaOH} \longrightarrow \text{HCOONa} + \text{H}_2\text{O} \tag{9}$$

$$2\text{HCOOH} + \text{Na}_2\text{CO}_3 \longrightarrow 2\text{HCOONa} + \text{H}_2\text{O} + \text{CO}_2 \tag{10}$$

where, in equation 9, HCOOH is formic acid being added to the carbon-dioxide capturing solution, NaOH is sodium hydroxide (the carbon-dioxide capture solution), HCOONa is sodium formate generated when the formic acid reacts with the sodium hydroxide carbon-dioxide capturing solution, and H$_2$O is water produced, along with the Sodium Formate (HCOONa), when the formic acid reacts with the sodium hydroxide carbon-capturing solution, and where, in equation 10, HCOOH is formic acid being added to the sodium carbonate solution generated through direct air capture, Na$_2$CO$_3$ is the sodium carbonate generated through direct air capture, HCOONa is sodium formate created when the formic acid reacts with the Sodium Carbonate (Na$_2$CO$_3$), H$_2$O is water generated, along with the Sodium Formate (HCOONa), when then formic acid reacts with the Sodium Carbonate (Na$_2$CO$_3$), and CO$_2$ is carbon dioxide generated, along with the Sodium Formate (HCOONa) and water, when the formic acid reacts with the Sodium Carbonate (Na$_2$CO$_3$).

The Carbon Dioxide (CO$_2$) in the capturing solution produced in the air contactor 302 is released (e.g., regenerated) in gaseous from and can be routed to the compressor 306, which is configured to compress the Carbon Dioxide (CO$_2$) into a liquid, solid, and/or gaseous form for storage (e.g., sequestration) and/or use in one or more industrial processes. The resultant Sodium Formate (HCOONa) can be routed to the syngas production system 300B for use in, for example, producing Hydrogen (H$_2$) as for Methanol (CH$_3$OH) production. In some aspects of the present technology, the Carbon Dioxide (CO$_2$) can be released from the capturing solution without the use of copious energy typically required by conventional DAC processes.

Figure 3B:
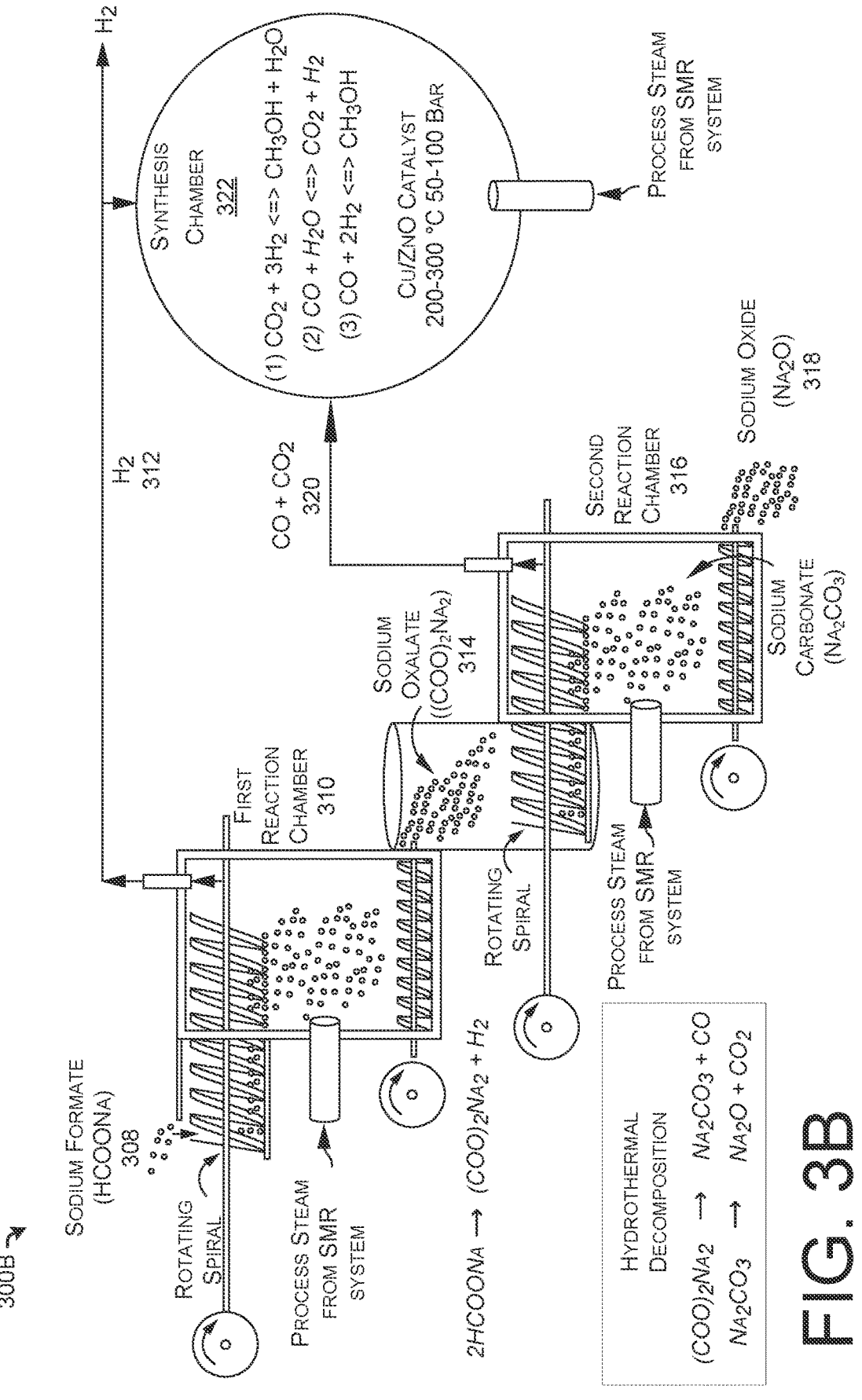
FIG. 3B schematically illustrates a representative schematic diagram of a syngas production system 300B of Hydrogen ($H_2$), Carbon Monoxide (CO), and Carbon Dioxide ($CO_2$) for Methanol ($CH_3OH$) production.

FIG. 3B schematically illustrates a representative schematic diagram of a syngas production system 300B of Hydrogen (H$_2$), Carbon Monoxide (CO), and Carbon Dioxide (CO$_2$) for Methanol (CH$_3$OH) production. The syngas production system 300B ("system 300B") may be utilized to receive Sodium Formate (HCOONa) 308. The system 300B may include a first thermal reaction chamber 310 utilized to output Hydrogen (H$_2$) 312 and/or Sodium Oxalate ((COO)$_2$Na$_2$) 314. The system 300B may include a second thermal reaction chamber 316 utilized to output Sodium Oxide (Na$_2$O) 318, and/or a combination of Carbon Monoxide (CO) and Carbon Dioxide (CO$_2$) 320. The system 300B may include a synthesis chamber 322 configured as a Methanol (CH$_3$OH) production system. It is noted that although the synthesis chamber 322 is depicted as being configured to utilize syngas to generate Methanol (CH$_3$OH), the synthesis chamber 322 may be configured to generate any chemical that utilizes syngas for production.

In an embodiment, the Sodium Formate (HCOONa) 308 may be fed into the first thermal reaction chamber 310 utilizing an auger. It is noted that although depicted within FIG. 3B and described herein as an auger and a rotating spiral, various methods may be used to feed the Sodium Formate (HCOONa) 308 into the first thermal reaction chamber 310.

In various cases, a rotating spiral (e.g., a rotating spiral chamber in the first thermal reaction chamber 310) may be utilized to convert the Sodium Formate (HCOONa) 308 between particles of different sizes. For example, the rotating spiral can be utilized to convert the Sodium Formate (HCOONa) 308 from relatively coarser (e.g., larger) particles to relatively finer (e.g., smaller) particles. The rotating and spiral can be utilized to assist in a conversion between the Sodium Formate (HCOONa) 308 to the Sodium Oxalate ((COO)$_2$Na$_2$) 314. The rotating spiral can be utilized to maintain the temperature in the first reaction chamber 310. The rotating spiral (e.g., a metal rotating spiral, which can be located partially and/or fully in the first thermal reaction chamber 310) can be operated by a control system utilized to control any portion of the syngas production system 300B and/or any portion of the integrated energy system 100, to rotate (e.g., spin) at one or more predetermined, and/or dynamically determined (e.g., in real-time), speeds during any operation of the syngas production system 300B.

In various cases, a rotating spiral (e.g., another rotating spiral) may be utilized to convert the Sodium Oxalate ($(COO)_2Na_2$) 314 between particles of different sizes, in a similar way as for the Sodium Formate (HCOONa) 308. For example, the rotating spiral can be utilized to convert the Sodium Oxalate ($(COO)_2Na_2$) 314 from relatively coarser particles to relatively finer particles. In some cases, the rotating spiral can be utilized to convert the Sodium Oxalate ($(COO)_2Na_2$) 314 to the Sodium Oxide ($Na_2O$) 318. The rotating spiral can be utilized to maintain the temperature in the second reaction chamber 316. The rotating spiral (e.g., another metal rotating spiral, which can be located partially and/or fully in the second thermal reaction chamber 316) can be operated by a control system utilized to control any portion of the syngas production system 300B and/or any portion of the integrated energy system 100 to rotate (e.g., spin), at one or more predetermined, and/or dynamically determined (e.g., in real-time), speeds during any operation of the syngas production system 300B.

In various cases, a cylinder, a pipe, a conduit, and/or any other suitable structure (e.g., any chamber) can be utilized to transfer chemicals from the first reaction chamber 310 and to the second reaction chamber 316. The chamber can form an airtight seal between the first reaction chamber 310 from the second reaction chamber 316. The cylinder can separate the first reaction chamber 310 from the second reaction chamber 316. The cylinder can be utilized to transport, from the first reaction chamber 310 and to the second reaction chamber 316, the Sodium Oxalate ($(COO)_2Na_2$) 314. In some cases, the cylinder can be utilized to transport the Sodium Oxalate ($(COO)_2Na_2$) 314, by preventing exposure of the Sodium Oxalate ($(COO)_2Na_2$) 314 to the air. The cylinder can provide an airtight seal between first reaction chamber 310 and the second reaction chamber 316. The cylinder can be utilized to provide temperature control for, and physical separation between, the first reaction chamber 310 and the second reaction chamber 316.

In an embodiment, the first reaction chamber utilizes process steam from a Small Modular Nuclear Reactor (SMR) system to maintain the temperature within the first thermal reaction chamber 310 at a range of between 300° C.-350° C. In an embodiment, maintaining the temperature of the first thermal reaction chamber 310 at a range of between 300° C.-350° C. may cause only the production of hydrogen gas 312 and Sodium Oxalate ($(COO)_2Na_2$) 314, as demonstrated by equation 11, shown below:

$$2HCOONa \longrightarrow (COO)_2Na_2 + H_2, \tag{11}$$

where 2HCOONa is two moles of sodium formate being introduced into the first reaction chamber, $(COO)_2Na_2$ is sodium oxalate produced by raising the temperature of the Sodium Formate (HCOONa), and $H_2$ is hydrogen gas produced, along with the Sodium Oxalate ($(COO)_2Na_2$), by raising the temperature of the Sodium Formate (HCOONa).

In an embodiment, the first thermal reaction chamber 310 requires an uninterrupted supply of thermal energy from the SMR system to maintain the temperature of the first thermal reaction chamber 310 at a range of 300° C.-350° C. in order to maintain the decomposition of Sodium Formate (HCOONa) 308 into Hydrogen gas ($H_2$) 312 and Sodium Oxalate ($(COO)_2Na_2$) 314. In an embodiment, the thermal energy to the Sodium Formate (HCOONa) 308, as a result of the temperature inside the first thermal reaction chamber 310, can cause the Sodium Formate (HCOONa) 308 powder to rapidly decompose into hydrogen gas 312 and Sodium Oxalate ($(COO)_2Na_2$) 314. In the embodiment, the Hydrogen ($H_2$) 312 is produced instantaneously following the decomposition of the Sodium Formate (HCOONa) 308. In the embodiment, the resulting Sodium Oxalate ($(COO)_2Na_2$) 314 sinks to the bottom of the first thermal reaction chamber 310 while still being thermally hot.

In an embodiment the Sodium Oxalate ($(COO)_2Na_2$) 314 may be transferred to the second reaction chamber 316. In an embodiment, the Sodium Oxalate ($(COO)_2Na_2$) 314 may be directly fed into the second reaction chamber 316 utilizing an auger. It is noted that although depicted within FIG. 3B and described herein as an auger and a rotating spiral, various methods may be used to feed the Sodium Oxalate ($(COO)_2Na_2$) 314 into the second reaction chamber 316.

In an embodiment the second reaction chamber 316 utilizes super-heated steam from the SMR system and/or compressed heating to maintain a temperature within the second reaction chamber 316 of at least 800° C. In an embodiment, maintaining the temperature of the second reaction chamber 316 at a temperature of at least 800° C. causes to maintain the hydrothermal decomposition process to the Sodium Oxalate ($(COO)_2Na_2$) 314 resulting in the rapid decomposition of the Sodium Oxalate ($(COO)_2Na_2$) 314 into Sodium Oxide ($Na_2O$) 318. In an embodiment, a combination of Carbon Monoxide (CO) and Carbon Dioxide ($CO_2$) 320 may instantly follow the rapid decomposition of the Sodium Oxalate ($(COO)_2Na_2$) 314 into Sodium Oxide ($Na_2O$) 318.

It should be noted that while the use of two reaction chambers (e.g., the first thermal reaction chamber 310 and the second reaction chamber 316) is depicted in this example, a single reaction chamber could be used instead. In such a case, the Hydrogen ($H_2$) would be produced alongside the Carbon Dioxide ($CO_2$) and Carbon Monoxide (CO). However, the Hydrogen ($H_2$) in this example could not be easily separated from the other gases. Hence, in a system that utilizes a single reaction chamber, it may be difficult to control the compositions of the syngases that are generated. The use of two reaction chambers would therefore be necessary by producing Hydrogen ($H_2$) separate from the other gases, the amount of Hydrogen ($H_2$) introduced into the synthesis chamber 322 can be controlled, allowing for more control over which syngas is produced.

In an embodiment, the Hydrogen ($H_2$) 312 and the combination of Carbon Monoxide (CO) and Carbon Dioxide ($CO_2$) 320 may be directly introduced into a synthesis chamber 322 to be used to generate Methanol ($CH_3OH$). In an embodiment, system 300B may be run continuously and may be entirely conducted at the SMR system site.

It is noted that the SMR system, including all support systems (e.g., electrical production system, steam transmission system, energy integration system, water treatment system, chemical production system, DAC system, gasification system, syngas production system, etc.) operably coupled thereto, may be physically located on a singular site having a threshold perimeter. In an embodiment each system and or support system may be located less than a threshold distance (e.g., roughly 1 km) of the SMR system. It is noted that each support system can be a permanently mobile or partially mobile system assembled at or near (e.g., roughly within 1 km) of the SMR. In an embodiment, each system and support system may be assembled and/or constructed within a threshold radius of the epicenter of the SMR system site.

In some examples, aspects of the present technology may be directed generally toward IESs, such as for use in green industrial processes that produce few or no carbon emissions, and associated devices and methods. The industrial processes can include, for example, Carbon Dioxide ($CO_2$) production.

The present technology is directed to a much a cleaner and highly efficient approach to producing Hydrogen ($H_2$) and Carbon Dioxide ($CO_2$) that can be used for industrial chemical production according to conventional technology. The presently disclosed methodology includes a multi-module power plant for the generation of electrical power and steam, and then coupling this to a high-temperature steam electrolysis (HTSE) cell for the production of Hydrogen ($H_2$) and simultaneously providing the energy needed to generate carbon dioxide gas. In representative embodiments, there are two methods that can be used for Carbon Dioxide ($CO_2$) generation. They are: 1) via a Direct-Air-Capture (DAC) system, or 2) via dual gasifiers in a two-stage pressure gasification by recycling of bulk plastic waste.

It is noted that the term bulk plastic waste, as used herein and throughout this disclosure, is intended to be interpreted as any type of plastic (e.g., polyethylene terephthalate, high-density polyethylene, polyvinyl chloride, low-density polyethylene, polypropylene, etc.) available for processing.

Currently, the predominant method of producing Hydrogen ($H_2$) and Carbon Dioxide ($CO_2$) for chemical products is by the steam-methane reforming process in which natural gas containing Methane ($CH_4$) is used both as the feedstock and combustion fuel for process heat. Unfortunately, this process results in significant Carbon Dioxide ($CO_2$) generation and emissions.

In contrast to existing systems that require shipments of resources (e.g., steam, etc.) over large distances, a DAC process according to the current technology may be extremely useful due to the processing facility being capable of being safely located next to or near industrial complexes, fossil power stations, and oil or chemical operations. A large amount of energy is required to capture 1 ton of airborne Carbon Dioxide ($CO_2$). Extremely large amounts of power (e.g., 8.81 GJ=2.45 MWh to capture 1 ton of Carbon Dioxide ($CO_2$) are often required to capture Carbon Dioxide ($CO_2$). According to conventional technology, an amount of energy required to capture 1 ton of Carbon Dioxide ($CO_2$) may be 8.81 GJ of natural gas or a combination of 5.25 GJ of natural gas and 366 kWh of electricity.

In contrast to conventional technology, the system 300B may be utilized to capture Carbon Dioxide ($CO_2$) without input of any natural gas. For example, the system 300B may utilize a DAC process to capture Carbon Dioxide ($CO_2$) by pulling in atmospheric air, then through a series of chemical reactions, utilizing steam from the SMR system to extract Carbon Dioxide ($CO_2$), while the rest of the air may be returned to the atmosphere. The DAC process can start with an air contactor—a large structure modelled after industrial cooling towers. A large fan can pull air into this structure, where it passes over thin structure surfaces that have Sodium Hydroxide (NaOH) solution flowing over them. The Sodium Hydroxide (NaOH) solution will chemically bind with the Carbon Dioxide ($CO_2$) molecules, thereby removing the Carbon Dioxide ($CO_2$) molecules from the air and trapping them in the liquid solution as a carbonate salt.

In some examples, the air contactor can begin the DAC process by drawing in air from the atmosphere to an air contactor where the air may pass over structure surfaces that have a Sodium Hydroxide (NaOH) solution and a carbon-dioxide capture solution flowing over them. The Carbon Dioxide ($CO_2$) molecules chemically react with the Sodium Hydroxide (NaOH) to create Sodium Carbonate ($Na_2CO_3$) and water, as expressed by equation 1, as discussed above with reference to FIG. 2, and as reproduced below:

$$2NaOH + CO_2 \longrightarrow Na_2CO_3 + H_2O, \qquad (1)$$

where 2NaOH is two moles of sodium hydroxide (the carbon-dioxide capture solution), $CO_2$ is carbon dioxide within the air, $Na_2CO_3$ is the sodium carbonate created when the airborne carbon dioxide molecules react with the sodium hydroxide capture solution, and $H_2O$ is created, along with the Sodium Carbonate ($Na_2CO_3$), when the airborne carbon dioxide molecules react with the sodium hydroxide capture solution.

The Carbon Dioxide ($CO_2$) contained in this carbonate solution (e.g., $Na_2CO_3$) can then be put through a series of chemical processes to increase its concentration, purify it, and compress it, so it can be delivered in gas form ready for use for the production of "Green" Ammonia ($NH_3$) or Methanol ($CH_3OH$) via hydrogenation. As used herein, a "green" chemical is a chemical produced in an industrial process that produces little to no carbon emissions when producing chemicals.

A two-stage pressure gasification system may be utilized for recycling plastic and biomass wastes into syngas, mostly Hydrogen ($H_2$) and Carbon Dioxide ($CO_2$). The process may take place in a two-stage gasifier that includes a low temperature gasifier and a high-temperature gasifier, both operating under pressure. As used herein, a gasifier is a large cylindrical pressure vessel configured to receive solid carbonaceous materials (e.g., plastic waste, biomass, coal, etc.) at the top and receive a mixture of steam and Oxygen (($O_2$) at the bottom. The mixture of Oxygen ($O_2$) and steam may vary depending on the materials added and the pressure and temperature requirements. The steam and Oxygen ($O_2$) mixture raises the temperature and pressure within the gasifier to cause the materials to undergo chemical reactions to produce non-combustible solid waste and mixed gas. The resulting mixed gas may be collected or re-directed to another system for additional processing, including removal of unwanted contaminants and/or removal of trace amounts of contaminants or to a second gasifier for the second stage in a two-stage process. Oxygen ($O_2$) and steam in existing systems may be used for thermal decomposition and partial oxidation of waste plastic that does not need to be sorted or separated. In existing systems, inorganic materials and metals within the plastic waste may be recovered as granulated slag for use as a raw material in cement and other construction materials, while recovered metal scraps that are reusable in existing systems may be produced.

A plastic waste, a crusher, a molding machine, a molded plastic, a dual gasifier processing system (e.g., a system utilizing two gasifiers), a scrubber, and a syngas byproduct may be utilized for syngas production. Plastic waste may be processed in a crusher to be physically processed into more uniform pieces. The uniform pieces of waste plastic may leave the crusher and enter the molding machine to be molded into molded plastic. The molded plastic may have a more specific geometry that may be necessary for further processing and may be fed into a dual gasifier processing system.

The dual gasifier processing system may include a low temperature gasifier and a high temperature gasifier. The two gasifiers may have operating temperatures including 600° C.-800° C., requiring a significant energy source. The dual gasifier processing system may produce mixed gases and wastewater. The mixed gases may be processed through a scrubber to separate undesirable particles from the mixed gases. The scrubber may produce useful syngas (e.g., Hydrogen ($H_2$), Carbon Monoxide (CO), Carbon Dioxide ($CO_2$), etc.).

A dual gasification process may include a small modular reactor plant system, waste plastic, a low temperature gasifier, a high temperature gasifier, granulated slag, resulting gas, cleaning water, and product gases. Waste plastic may be fed into a low temperature gasifier. It is understood that although described as a low temperature gasifier, operating temperatures may include 600° C.-800° C.

It is noted that syngas production methods utilizing Methane ($CH_4$) and Carbon Dioxide ($CO_2$) require consistent temperatures of >700° C., which requires large amounts of energy. In contrast to systems for syngas production that require large amounts of energy to provide adequate temperatures and pressures, the syngas production technology accordingly to techniques discussed herein are not hampered by an energy limitation when coupled to an SMR system, as described herein, and may utilize continuous amounts of steam and electricity necessary to continuously produce syngas.

In an embodiment, the SMR system may include a multi-module system. Each module may be independently operated to produce electricity or steam. In such embodiments, multiple modules may be dedicated to producing steam when high temperature steam is required and the high-temperature steam may be continuously provided for use. The systems and/or modules within the system 300B may each be located less than a threshold distance (e.g., roughly 1 km) from one another.

It is noted that existing syngas production methods require multiple physically separate systems to produce various gases required for chemical production, including Ammonia ($NH_3$) and Methanol ($CH_3OH$). Existing systems often require resources (e.g., Oxygen ($O_2$)) to be shipped over large distances for production of syngas. In contrast to existing systems, the system 300B with the two-stage gasifier being operated according to the techniques discussed can utilize steam output from a co-located SMR system to produce Oxygen ($O_2$), which may be utilized in the dual gasifier to produce syngas. The system 300B can be utilized for the continuous production of Hydrogen ($H_2$), Carbon Monoxide (CO), and Carbon Dioxide ($CO_2$) in the same system, which also allows for the continuous production of Methanol ($CH_3OH$).

Figure 4:
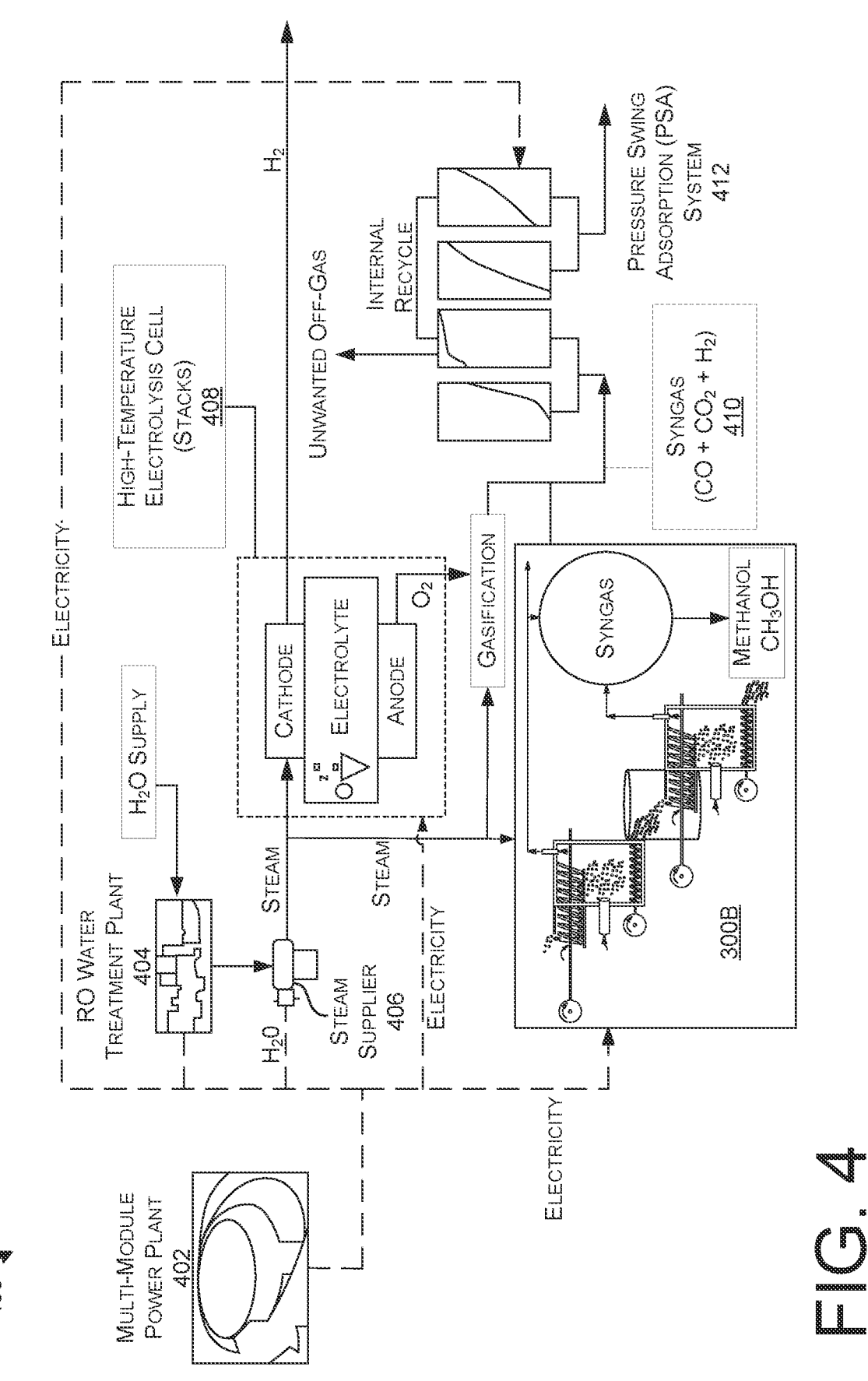
FIG. 4 schematically illustrates a production system producing syngas using a nuclear reactor system. For example, the nuclear reactor system may include a Small Modular Nuclear Reactor (SMR) system.

FIG. 4 schematically illustrates a production system 400 producing syngas using a nuclear reactor system. For example, the nuclear reactor system may include a Small Modular Nuclear Reactor (SMR) system.

The production system 400 may utilize the syngas production system 300B and include a multi-module power plant 402, a water treatment plant 404, a steam supplier 406, a high-temperature electrolysis cell 408, syngas 410, and a pressure swing adsorption (PSA) system 312. In some examples, the multi-module power plant 402 may be utilized to implement the power plant system 102 as discussed above with reference to FIG. 1.

The multi-module power plant 402, the water treatment plant 404, a steam supplier 406, a high-temperature electrolysis cell 408, syngas 410, and/or the PSA system 412 may be operably coupled any number of any of the others. Alternatively or additionally, the multi-module power plant 402, the water treatment plant 404, the steam supplier 406, the high-temperature electrolysis cell 408, the syngas 410, and/or the pressure swing adsorption (PSA) system 412 may be operably coupled to a syngas production system, such as the syngas production system 300B, as discussed above with reference to FIG. 3B. Although syngas may be produced utilizing the production system 400, with the syngas production system 300B, the production system 400 may utilize alternative syngas production systems in addition to, or instead of, the syngas production system 300B.

In an embodiment, the multi-module power plant 402 may provide electricity to the water treatment plant 404, the steam supplier 406, the high-temperature electrolysis cell 408, the syngas production system 300B, and the PSA system 412. In an embodiment, the water treatment plant 404 may provide water to the steam supplier 406. In an embodiment, the steam generator may provide steam to the high temperature electrolysis cell 408 and the syngas production system 300B.

In an embodiment, the high-temperature electrolysis cell (or "electrolyzer") 408 may utilize electricity to convert steam into hydrogen gas and oxygen gas. For example, the electrolysis cell 408 may include a polymer electrolyte membrane (PEM) electrolyzer, and/or one or more other types of electrolyzers. The electrolysis cell 408 can receive the steam at any temperature capable of enabling conversion of the steam into the hydrogen gas and oxygen gas. The electrolysis cell 408 can represent any type of cell configured to use the electricity to split water (e.g., the steam) of any form into the hydrogen gas and the oxygen gas. In various cases, the electrolysis cell 408 can include an anode and a cathode separated by an electrolyte.

In various cases, the steam may react at the anode to form Oxygen ($O_2$) (e.g., the oxygen gas) and positively charged hydrogen ions (e.g., protons). The electrons may flow through an external circuit and the hydrogen ions may selectively move across the electrolysis cell 408 to the cathode. At the cathode, the hydrogen ions may combine with electrons from the external circuit to form hydrogen gas (e.g., via an anode reaction: $2H_2O \rightarrow O_2 + 4H^+ + 4\ e^-$, where $2H_2O$ is two molecules of water, $O_2$ is oxygen gas, $4H^+$ is four hydrogen ions, and 4 e is four electrons; and a cathode reaction: $4H^+ + 4\ e^- \rightarrow 2H_2$, where $4H^+$ is four hydrogen ions, 4 $e^-$ is four electrons, and $2H_2$ is two moles of hydrogen gas). The hydrogen gas may be utilized, sourced, and/or output, by the production system 400.

In an embodiment, the multi-module power plant 402 may be utilized to produce various products (e.g., syngas, Methanol ($CH_3OH$), Sodium Hydroxide (NaOH), Sodium Formate (HCOONa), etc.) by utilizing various methods (e.g., syngas production utilizing continuous sodium formate decomposition and/or a two-stage gasification system to decompose bulk plastic waste).

For example, syngas production utilizing continuous Sodium Formate (HCOONa) decomposition may be utilized with the multi-module power plant 402 being operably coupled to the PSA system 412 may enable the electricity to be provided by the multi-module power plant 402 and to the PSA system 412. The syngas production system 300B being operably coupled to the PSA system 412 may enable the syngas 410 to be provided by the syngas production system 300B and to the PSA system 412. For example, the syngas 410 may include a combination of one or more of Carbon Monoxide (CO), Carbon Dioxide ($CO_2$), and Hydrogen ($H_2$).

For example, syngas production utilizing a two-stage gasification process for bulk plastic waste system may be utilized with the multi-module power plant 402 being operably coupled to the PSA system 412 may enable the electricity to be provided by the multi-module power plant 402 and to the PSA system 412. Additionally, the multi-module power plant 402 may provide the steam necessary for each stage of gasification while the high-temperature electrolysis cell 408 may provide the necessary Oxygen ($O_2$) needed to combine with the steam for gasification in each gasifier. The two-stage gasification process for bulk plastic waste system being operably coupled to the PSA system 412 may enable the syngas 410 to be provided by the two-stage gasification process for bulk plastic waste system and to the PSA system 412. For example, the syngas 410 may include a combination of one or more of Carbon Monoxide (CO), Carbon Dioxide ($CO_2$), and Hydrogen ($H_2$).

It is noted that the multi-module power plant 402 may utilize one or more modules to simultaneously produce syngas utilizing both the syngas production system 300B and a two-stage gasification system. For example, in a multi-module power plant configuration having six modules, one module may be offline for refueling, while three modules may be dedicated to providing adequate electrical and steam demand requirements for operating a two-stage gasification process, and while the remaining 2 modules provide the electrical and steam demand needs for operating syngas production system 300B.

It is noted that while the multi-module power plant 402 may be producing syngas utilizing one or more systems, one or more modules of the multi-module power plant 402 may utilize a seawater desalination system, a chlor-alkali membrane process, a DAC system, and a formic acid treatment process to produce the Sodium Formate (HCOONa) utilized by the syngas production system 300B. For example, one or more modules may provide steam and electricity to a seawater desalination system 204 to produce Sodium Chloride (NaCl), then utilize the chlor-alkali membrane process 206 to produce Sodium Hydroxide (NaOH). The Sodium Hydroxide (NaOH) may then be used in a DAC process to generate Sodium Carbonate ($Na_2CO_3$), which can be treated by formic acid to generate the Sodium Formate (HCOONa) 308 used to produce syngas via syngas production system 300B.

In various examples, the PSA system 412 can be utilized to separate the syngas into one or more gases (e.g., one or more specified and/or predetermined gases) and/or one or more other gases (e.g., one or more unwanted off-gases). The specified gas(es) obtained by the PSA system 412 can include, for example, Hydrogen ($H_2$), Carbon Monoxide (CO), and Carbon Dioxide ($CO_2$). The unwanted off-gas(es) generated by the PSA system 412 can be, for example, recycled and input back into the PSA system 412. The unwanted off-gas(es) can include, for example, one or more of various types of gases other than Hydrogen ($H_2$), Carbon Monoxide (CO), and Carbon Dioxide ($CO_2$). By recycling gases, for example, the production system 400 can operate as a closed-loop system, with zero emissions. The production system 400 being a no-emission system can be utilized to produce and/or output Methanol ($CH_3OH$) without any input of natural gas. In contrast to providers of existing systems that must purchase and/or obtain natural gas for generation of Methanol ($CH_3OH$), a provider of the production system 400 may utilize the production system 400 to generate Methanol ($CH_3OH$) without any expenditures/costs related to provisioning natural gas. Various portions of the multi-module power plant 402 may be utilized to provide steam to various portions of the production system 300, such as the steam supplier 406. Individual modules (e.g., individual SMRs) of the multi-module power plant 402 may be controlled separately. For example, control of the multi-module power plant 402 may include control of individual SMRs to output steam, electricity, or a combination thereof. Individual SMRs may be controlled to output steam at desired a steam production rate. For example, the SMR may utilize a turbine bypass for steam to bypass a turbine of the SMR to go directly to the steam supplier 406. By utilizing the turbine bypass, the SMR may be utilized to provide the steam to the steam supplier 406, which may provide steam to the high-temperature electrolysis cell 408 and/or to the syngas production system 300B. For example, by utilizing the turbine bypass, the SMR may provide the steam, via the steam supplier 406, and to the syngas production system 300B at a temperature enabling the continuous syngas generation by the syngas production system 300B.

In a hypothetical example, a multi-module power plant 402 may include one or more power modules dedicated to steam production and/or one or more modules dedicated to electricity production. Each module originally dedicated to producing steam may be configured to produce electricity if the steam demand decreases and the electrical demand increases. It is anticipated that changes in the form of energy production for each power module may be quickly changed to dynamically respond to energy demands in real time according to system conditions or requirements.

Following the example, the multi-module power plant 402 may provide electricity and steam to the water treatment plant 404 to produce water that may be utilized by production system 400. The water treatment plant 404 may be a desalination plant or other water treatment facility. The water treatment plant 404 may then provide water to the steam supplier 406 to produce process steam. The steam supplier 406 may provide steam to one or more syngas generation systems. It is contemplated that one or more syngas production systems may be simultaneously operating, and that the syngas production systems may not be of the same type. For example, one or more gasification systems may be operating while one or more production systems 300B may be operating.

In an embodiment utilizing a two-stage gasification system, the steam supplier 406 may provide steam to a high-temperature electrolysis cell 408 while the multi-module power plant 402 may provide electricity to the high-temperature electrolysis cell 408, which may produce hydrogen gas and oxygen gas. The oxygen gas may be fed directly into the first gasifier in the two-stage gasification process along with process steam. The gas produced in the first gasifier may be fed into a second gasifier to begin the second stage of the gasification process. The second gasifier may receive Oxygen ($O_2$) from the high-temperature electrolysis cell 408 as well as additional process steam. It is noted that the process steam entering the second gasifier is at a higher temperature than the steam used in the first gasifier. The second gasifier may produce syngas 410 that may be recovered and re-directed into the pressure swing adsorption system 412. The pressure swing adsorption system 412 may be used to separate gas species from a mixture of gases according to the characteristics and affinity for an absorbent material of each species.

In a hypothetical example, the multi-module power plant 402 may utilize a chemical production system to produce Sodium Formate (HCOONa) 308. It is noted that the production of Sodium Formate (HCOONa) 308 may be continuous for as long as desired. Sodium Formate (HCOONa) 308 may be fed into a rotating auger that may feed controlled amounts into the top of a first reaction chamber. The first reaction chamber may receive super-heated process steam from the multi-module power plant 402 in order to maintain the temperature within the first thermal reaction chamber 310 at a range of between 300° C.-350° C. The temperature of the first thermal reaction chamber 310 may cause a thermal shock to the Sodium Formate (HCOONa) 308, which may cause an instantaneous decomposition of the Sodium Formate (HCOONa) 308 into Sodium Oxalate $((COO)_2Na_2)$ 318, the decomposition may also generate hydrogen gas 312.

The newly formed Sodium Oxalate $((COO)_2Na_2)$ may fall into a second auger at the bottom of the first thermal reaction chamber 310 and be fed directly into the top of the second reaction chamber 320. The second auger may provide a consistent supply of Sodium Oxalate $((COO)_2Na_2)$ into the second reaction chamber which receives super-heated process steam (i.e., hydrothermal decomposition) from the multi-module power plant 402 to maintain a temperature of >800° C. Maintaining the temperature of the second reaction chamber 320 at a temperature of at least 800° C. causes a thermal shock to the Sodium Oxalate $((COO)_2Na_2)$ 318 resulting in the rapid decomposition of the Sodium Oxalate $((COO)_2Na_2)$ 318 into Sodium Oxide $(Na_2O)$ 322. The decomposition of the sodium oxalate 314 also produces a combination of Carbon Monoxide (CO) and Carbon Dioxide $(CO_2)$ 320. It is noted that the ability to produce super-heated steam for prolonged periods of time is essential to the production of the combination of Carbon Monoxide (CO) and Carbon Dioxide $(CO_2)$ 320.

The Hydrogen $(H_2)$ 316 produced in the first thermal reaction chamber 310 may be collected and combined with the combination of Carbon Monoxide (CO) and Carbon Dioxide $(CO_2)$ 324 produced in the second reaction chamber 320 inside a synthesis chamber 322 for producing Methanol $(CH_3OH)$ via the hydrogenation of the Carbon Dioxide $(CO_2)$. The synthesis chamber 322 may also receive steam to maintain a temperature range including 200° C.-300° C. For example, one mole of Carbon Dioxide $(CO_2)$ may react with three moles of Hydrogen $(H_2)$ to produce one mole of Methanol $(CH_3OH)$ and one mole of water.

However, the hydrogenation of Carbon Dioxide $(CO_2)$ to produce Methanol $(CH_3OH)$ requires a catalyst to induce catalysis for Methanol $(CH_3OH)$ production, such as copper and/or zinc oxide-based catalysts. These catalysts are necessary for the necessary reactions to begin, but the formation of water molecules may deactivate the catalyst, which would stop the production of Methanol $(CH_3OH)$ and require the process to start over.

Water molecules are produced when carbon dioxide molecules react with Hydrogen $(H_2)$ (e.g., one mole of Carbon Dioxide $(CO_2)$ may react with three moles of Hydrogen $(H_2)$ to produce one mole of Methanol $(CH_3OH)$ and one mole of water), so without additional intervention, water molecules will be formed and the catalyst will be deactivated very quickly. Because of the likelihood of water molecule generation, Carbon Monoxide (CO) is essential. The Carbon Monoxide (CO) will react with the water to produce Carbon Dioxide $(CO_2)$ and hydrogen gas (e.g., a water-gas-shift reaction wherein one mole of Carbon Monoxide (CO) reacts with one mole of water to generate one mole of Carbon Dioxide $(CO_2)$ and one mole of Hydrogen $(H_2)$). With the water molecules converted to Hydrogen $(H_2)$ and Carbon Dioxide $(CO_2)$, Methanol $(CH_3OH)$ production will continue. While Methanol $(CH_3OH)$ may be produced through the interaction of Carbon Dioxide $(CO_2)$ and Hydrogen $(H_2)$, Carbon Monoxide (CO) is essential because of its reaction with water molecules to prevent deactivation of the catalyst. After the water-gas-shift reaction, one mole of Carbon Dioxide $(CO_2)$ may react with two moles of Hydrogen $(H_2)$ to produce one mole of Methanol $(CH_3OH)$.

Because Carbon Monoxide (CO) is essential to the production of Methanol $(CH_3OH)$ and because Methanol $(CH_3OH)$ is a valuable chemical, Carbon Monoxide (CO) is expensive and may cause Methanol $(CH_3OH)$ production to be cost prohibitive. Because the multi-module power plant 402 is capable of producing Hydrogen $(H_2)$, Carbon Dioxide $(CO_2)$, and Carbon Monoxide (CO) continuously on-site, the methods utilizing the technology discussed herein do not suffer from the same constraints. It is noted that the cost of production chemicals includes more than merely the purchase price. For example, purchasing chemicals requires the chemicals to be delivered, which reduces the potential for mobile or partially mobile production sites. Additionally, the transportation vehicles delivering the chemicals may burn fuel which also produces unwanted emissions.

Figure 5:
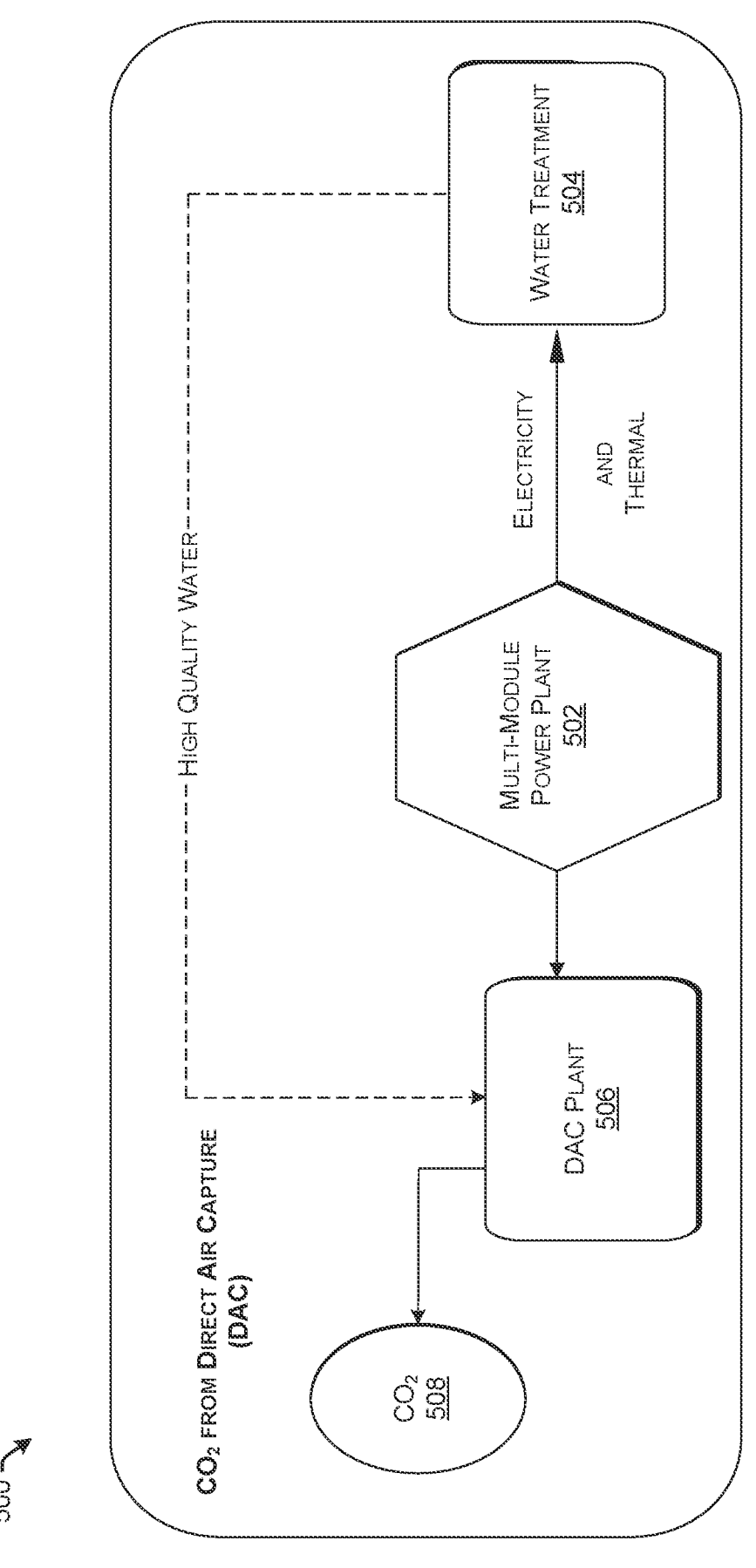
FIG. 5 schematically illustrates an example system for capturing airborne carbon dioxide ($CO_2$) using a nuclear reactor system and Direct Air Capture (DAC) process.

FIG. 5 schematically illustrates an example system 500 for capturing airborne carbon dioxide $(CO_2)$ using a nuclear reactor system and Direct Air Capture (DAC) process.

The system 500, for example, a DAC system, can include a multi-module power plant 502, a water treatment plant 504, and a DAC plant 506 configured to produce Carbon Dioxide $(CO_2)$ 508. In an embodiment, the multi-module power plant 502 may provide electrical and thermal energy to a water treatment plant 504 and a DAC plant 506. In an embodiment, a water treatment plant 504 may supply high quality water to a DAC plant 506. In an embodiment, a DAC plant 506 may utilize energy from the multi-module power plant 502 and high-quality water from a water treatment plant 504 to produce Carbon Dioxide $(CO_2)$ 508. In various examples, the multi-module power plant 502, a water treatment plant 504, and a DAC plant 506 may be utilized to implement the power plant system 102, the water treatment system 104, and the DAC system 106, as discussed above with reference to FIG. 1.

In contrast to conventional systems, DAC systems (including systems powered by natural gas and/or fossil fuel consumption, systems that produce harmful emissions, and/or systems that obtain necessary elements through processes that produce harmful emissions), when integrated into a power plant system (e.g., the power plant system 102) that utilizes a multi-module power plant (e.g., the multi-module power plant 502) according to the techniques discussed herein, can provide a more efficient and environmentally responsible direct air capture system. For example, the system 500 may utilize the DAC 506 to capture airborne Carbon Dioxide $(CO_2)$. While conventional technology captures and/or produces Carbon Dioxide $(CO_2)$ by utilizing components configured to process various chemicals (e.g., Sodium Carbonate $(Na_2CO_3)$, Sodium Hydroxide (NaOH), Calcium Hydroxide $(Ca(OH)_2)$, Calcium Carbonate $(CaCO_3)$, and Calcium Oxide (CaO)) that are unable to efficiently, cost-effectively, safely and cleanly produce Carbon Dioxide $(CO_2)$, the DAC plant 506, located at or near the location of the multi-module power plant 502, may be utilized to produce Carbon Dioxide ($CO_2$) 508 without requiring natural gas input or environmentally harmful emission output.

The concentration of Carbon Dioxide ($CO_2$) in the atmosphere globally is rising as a result of the continuous use of carbon-rich fossil fuels like coal, oil, and natural gas (Methane ($CH_4$)). Carbon Dioxide ($CO_2$) is a greenhouse gas; it absorbs and radiates heat. The more Carbon Dioxide ($CO_2$) in the atmosphere, the more heat radiating from the Earth that can be radiated back to the Earth's surface, which contributes to the increase of the global temperature. A high concentration of Carbon Dioxide ($CO_2$) in the atmosphere also contributes to ocean acidification; the Carbon Dioxide ($CO_2$) reacts with the ocean water molecules to create carbonic acid. The increased production of carbonic acid lowers the ocean's pH, raising its acidity. While known carbon-dioxide-capturing processes may aid in reducing the increased Carbon Dioxide ($CO_2$) concentration, the significant energy demand required to power the processes results in producing more Carbon Dioxide ($CO_2$) than is captured. Therefore, a new carbon-dioxide-capturing process in necessary; a carbon-dioxide-capturing process that produces little to no Carbon Dioxide ($CO_2$) emission.

In a hypothetical example, utilizing conventional technology for prolonged direct air capture requires large amounts of energy, and therefore cost. In contrast to conventional systems that are expensive and environmentally unsafe, the systems according to the current invention may be utilized for providing Carbon Dioxide ($CO_2$) through direct air capture with lower costs and greater levels of efficiency. In contrast to conventional technology that requires large amounts of energy to energize the large fans utilized to draw air into the Carbon Dioxide ($CO_2$) absorber, the systems according to the current invention utilize SMR modules to produce the necessary energy to maintain prolonged direct air capture. It is noted that the concentration of Carbon Dioxide ($CO_2$) in the air is not high, which means that large amounts of energy are required to capture large amounts of Carbon Dioxide ($CO_2$) from the atmosphere because the system must operate for a long time. The more energy used to capture Carbon Dioxide ($CO_2$) (e.g., 1 ton or any other amount of Carbon Dioxide ($CO_2$)) from the air, the higher the cost and the greater environmental impact. However, when a DAC system is coupled with a multi-module power plant (e.g., the multi-module power plant 502 depicted in FIG. 5), the DAC system (e.g., DAC plant 506) is not constrained by an energy limitation and may be continuously run. The DAC plant 506 may be continuously run because multi-module power plant 502 may provide continuous steam and/or electrical energy as necessary while yielding zero or negative carbon emissions.

FIG. 6 illustrates a flowchart describing an example process 600 for utilizing an integrated Small Modular Nuclear Reactor (SMR) system to continuously and simultaneously generate Hydrogen ($H_2$), Carbon Monoxide (CO), and Carbon Dioxide ($CO_2$) for Methanol ($CH_3OH$) production. The order in which the operations or steps are described is not intended to be construed as a limitation, and any number of the described operations may be combined in any order and/or in parallel to implement integrated SMR system (e.g., the production system 300, as discussed above with reference to FIG. 3).

At step 602, the process 600 may include utilizing a small modular nuclear reactor power plant system to generate processing steam and electricity, as needed, for the integrated SMR system. For example, the seawater desalination system 204, the Chlor-Alkali Membrane process 206, and the DAC process 206 utilize the electricity generated by the SMR system to produce Sodium Carbonate ($Na_2CO_3$), which is processed to produce the Sodium Formate (HCOONa) 308 utilized in the syngas production system 300B.

At step 604, the process 600 may include receiving the process steam and electricity at a syngas generation system that is operably coupled to the small modular nuclear reactor power plant system. For example, the syngas production system 300B receives both electrical energy and process steam to convert Sodium Formate (HCOONa) into syngas for Methanol ($CH_3OH$) production utilizing a Methanol ($CH_3OH$) production system. The syngas production system 300B uses electricity to energize the electrical components and uses the process steam to generate the high temperatures requires for chemical decomposition.

At step 606, the process 600 may include receiving Sodium Formate (HCOONa) in a first reaction chamber of the chemical polymer generation system and utilizing the process steam and electricity to decompose the Sodium Formate (HCOONa) into Sodium Oxalate (($COO$)$_2Na_2$) and Hydrogen ($H_2$) (one of the three elements necessary for Methanol ($CH_3OH$) production). For example, the syngas production system 300B utilizes the electricity to energize augers that feed the Sodium Formate (HCOONa) 308 into the first thermal reaction chamber 310. The first thermal reaction chamber 310 receives process steam from the SMR system to heat the Sodium Formate (HCOONa) 308 and cause its decomposition into Sodium Oxalate (($COO$)$_2Na_2$) 314 and Hydrogen ($H_2$) 312. The Hydrogen ($H_2$) 312 may then be used for Methanol ($CH_3OH$) production.

At step 608, the process 600 may include receiving Sodium Oxalate (($COO$)$_2Na_2$) in a second reaction chamber of the chemical polymer generation system and utilizing the super-heated steam to hydrothermally decompose the Sodium Oxalate (($COO$)$_2Na_2$) into Sodium Oxide ($Na_2O$) and a combination of Carbon Monoxide (CO) and Carbon Dioxide ($CO_2$), with Carbon Monoxide (CO) and Carbon Dioxide ($CO_2$) being two of the three elements necessary for Methanol ($CH_3OH$) production. For example, the syngas production system 300B utilizes the electricity to energize augers that feed the Sodium Oxalate (($COO$)$_2Na_2$) 314 into the second reaction chamber 316. The second reaction chamber 316 receives super-heated steam from the SMR system to hydrothermally decompose the Sodium Oxalate (($COO$)$_2Na_2$) 314 and cause its decomposition into Sodium Oxide ($Na_2O$) 212 and a combination of Carbon Monoxide (CO) and Carbon Dioxide ($CO_2$) 324. The combination of Carbon Monoxide (CO) and Carbon Dioxide ($CO_2$) 324 may then be used for Methanol ($CH_3OH$) production.

Figure 7:
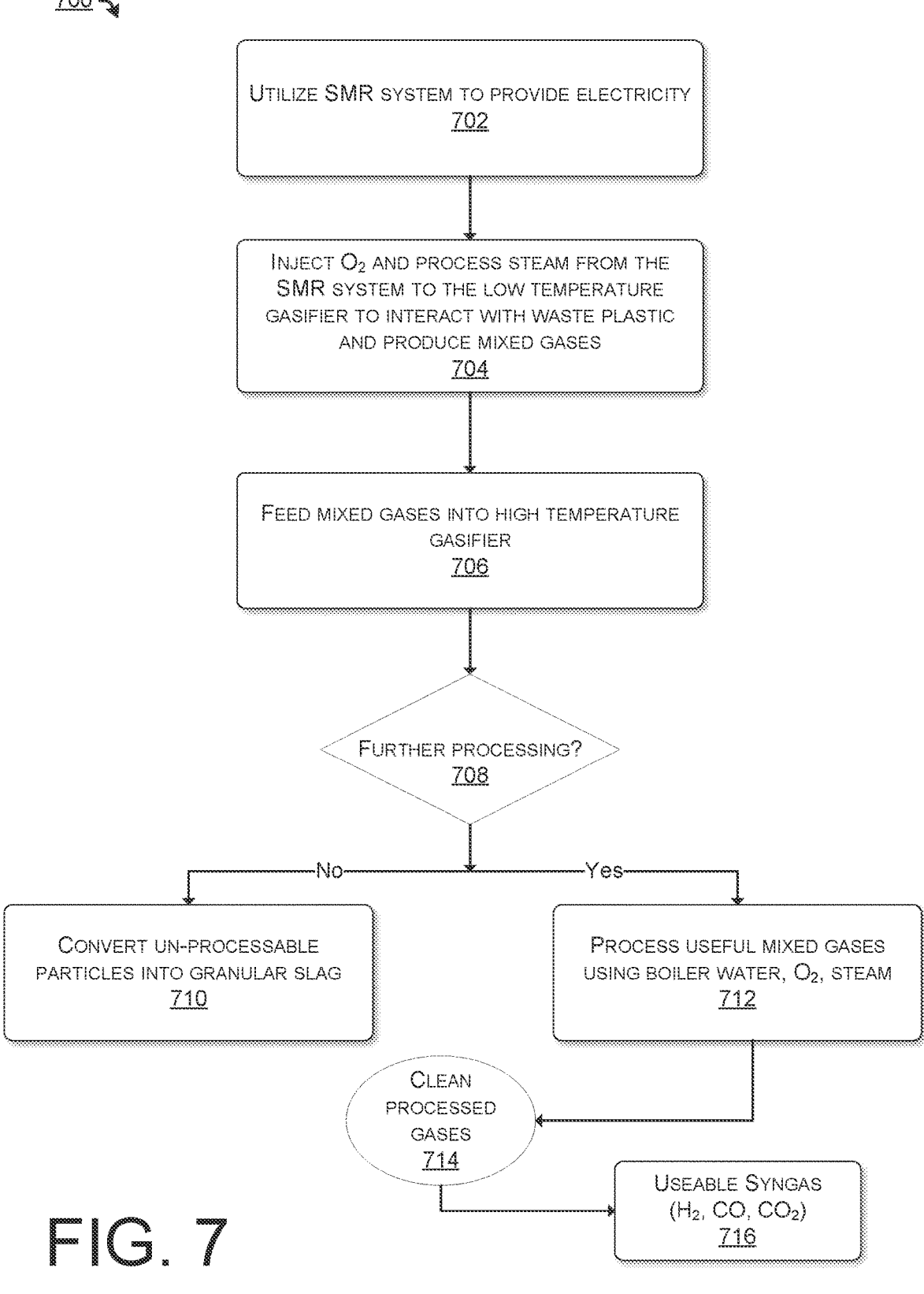
FIG. 7 illustrates a flow diagram of an example process associated with the production of syngas by processing bulk plastic waste utilizing a two-stage pressure gasification system.

FIG. 7 illustrates a flow diagram of an example process 700 associated with the production of syngas by processing bulk plastic waste utilizing a two-stage pressure gasification system. The order in which the operations or steps are described is not intended to be construed as a limitation, and any number of the described operations may be combined in any order and/or in parallel to implement the two-stage pressure gasification system. It is noted that the term bulk plastic waste, as used herein and throughout this disclosure, is intended to be interpreted as any type of plastic (e.g., polyethylene terephthalate, high-density polyethylene, polyvinyl chloride, low-density polyethylene, polypropylene, etc.) available for processing. It is also noted that bulk plastic waste may be one or more types of plastic waste and need not be sorted or separate for processing. Before being fed into the first of two gasifiers, the bulk plastic waste may be processed (e.g., an embodiment of the production system

400 producing syngas utilizing two-stage pressure gasification system, as discussed above with reference to FIG. 4). For example, the bulk plastic waste may be crushed and molded into uniform pieces of molded plastic.

At step 702, the process 700 may include a multi-module power plant, a reverse osmosis (RO) water treatment plant, a steam generator, a high-temperature electrolysis cell, a two-stage pressure gasification system, and a Pressure Swing Adsorption (PSA) system. In an embodiment, the multi-module power plant, the reverse osmosis (RO) water treatment plant, the steam generator, the high-temperature electrolysis cell, the two-stage pressure gasification system, and the Pressure Swing Adsorption (PSA) system may be the same or similar to the multi-module power plant 402, the reverse osmosis (RO) water treatment plant 404, the steam supplier 406, the high-temperature electrolysis cell 408, the two-stage pressure gasification system, and the Pressure Swing Adsorption (PSA) system 412, as depicted in FIG. 4. A Small Modular Nuclear Reactor (SMR) system may provide adequate electricity and steam for use during the two-stage pressure gasification system. For example, a dual gasifier system may utilize electricity to energize the components necessary to perform operate the dual gasification system, including a low-temperature gasifier, a high-temperature gasifier, and gas cleaning equipment. The low-temperature gasifier and the high-temperature gasifier utilize the process steam provided by the SMR system to maintain the temperatures required in each gasifier.

At step 704, the process 700 may include a multi-module power plant, a steam generator, a low-temperature gasifier, a high-temperature electrolysis cell, and oxygen gas. In an embodiment, the multi-module power plant, the steam generator, and the high-temperature electrolysis cell may be the same or similar to the multi-module power plant 402, the steam supplier 406, and the high-temperature electrolysis cell 408 depicted in FIG. 4. Oxygen ($O_2$) and steam may interact with the waste plastic inside the low-temperature gasifier to produce mixed gases. For example, bulk waste plastic may be deposited into the low-temperature gasifier and may be of any variety of plastic and need not be sorted. A mixture of process steam and Oxygen ($O_2$) is then injected into the low-temperature gasifier. The Oxygen ($O_2$) may be Oxygen ($O_2$) produced utilizing the syngas production system 300B, another syngas production system coupled to the SMR system, or may be Oxygen ($O_2$) that has been recaptured as a by-product from a chemical production system that may be coupled to the SMR system. The injection of process steam and Oxygen ($O_2$) will heat the bulk plastic waste such that the bulk waste will produce the release of mixed gases and the formation of incombustible solid matter. The solid matter may be removed through the bottom of the low-temperature gasifier, and the gases may be fed into the high temperature gasifier.

At step 706, the process 700 may include a multi-module power plant, a steam generator, a high-temperature gasifier, a high-temperature electrolysis cell, and mixed gases produced in a low-temperature gasifier. In an embodiment, the multi-module power plant, the steam generator, and the high-temperature electrolysis cell may be the same or similar to the multi-module power plant 402, the steam supplier 406, and the high-temperature electrolysis cell 408 depicted in FIG. 4. The mixed gases may be fed into a high-temperature gasifier. In an embodiment, the high-temperature gasifier may have operating temperatures including 1300° C.-1500° C. For example, the mixed gases generated in the low-temperature gasifier may be fed directly into the high-temperature gasifier. The high temperature gasifier may also receive process steam and Oxygen ($O_2$) to maintain a specific temperature and pressure range within the high-temperature gasifier. The injection of process steam and Oxygen ($O_2$) will cause the formation of granulated slag, a non-combustible material that may be used in other industries, and a useful mixed gas.

At step 708, the process 700 may include a high-temperature gasifier, a high-temperature electrolysis cell, and oxygen gas. In an embodiment, the high-temperature electrolysis cell may be the same or similar to the high-temperature electrolysis cell 408 depicted in FIG. 4. There may be particles within the mixed gases that may not be processed further. For particles unable to be processed further, dual gasification process 700 continues to step 710. For the gases capable of further processing, dual gasification process 700 continues to step 712. For example, processing the mixed gas in the high-temperature gasifier may produce granulated slag and a useful mixed gas. The granulated slag may not be processed further in the two-stage pressure gasification system 700. The useful mixed gas may be processed further if desired.

At step 710, the process 700 may include a high-temperature gasifier and a granular slag collection system. The particles within the mixed gases unable to be processed further are converted into granular slag and recovered for use as a raw material in cement and other construction materials. For example, the granulated slag may be removed from the high-temperature gasifier and used in the production of cement or other construction materials because of its rock-like characteristics.

At step 712, the process 700 may include a high-temperature gasifier and mixed gas. The high temperature gasifier may utilize boiler water, quenching water, Oxygen ($O_2$), and steam to further process the mixed gases into the resulting gas. For example, the mixed gas can undergo various reactions due to the interactions with the Oxygen ($O_2$) and the temperature reactions caused by the process steam, boiler water, and quenching water. The interactions may cause the mixed gas to convert into a useful mixed gas that may be processed and separated.

At step 714, the process 700 may include mixed gas and gas cleaning equipment. The resulting useful mixed gas may be fed through gas cleaning equipment. The gas cleaning equipment may utilize cleaning water to remove unwanted particles from the resulting gas in order to produce product gases. For example, the useful mixed gas may still contain contaminants and undesired compounds. Gas cleaning equipment may be used, as required, to separate particles, remove tar, and remove trace amounts of contaminants that may remain. It is noted that the specific type of gas cleaning equipment depends on the specific gases being produced and desired specification for the gases being produced.

At step 716, the process 700 may include product gases, gas cleaning equipment, a PSA system, and syngas. In an embodiment, the PSA system and the syngas may be the same or similar to the PSA system 412 and the syngas 410 depicted in FIG. 4. The produced gases may include syngas (e.g., Hydrogen ($H_2$), Carbon Monoxide (CO), and Carbon Dioxide ($CO_2$), etc.). For example, the gas cleaning equipment may remove contaminants and undesired compounds to ensure that Hydrogen ($H_2$), Carbon Monoxide (CO), and Carbon Dioxide ($CO_2$) are generated. Additionally, the gas cleaning equipment may ensure that the Hydrogen ($H_2$), Carbon Monoxide (CO), and Carbon Dioxide ($CO_2$) produced are of a suitable quality for producing useful chemicals (e.g., Methanol ($CH_3OH$), Ammonia ($NH_3$), etc.).

FIG. 8 illustrates a flow diagram of an example process 800 for utilizing a small modular reactor plant system to capture Carbon Dioxide ($CO_2$) using a Direct Air Capture (DAC) process. The order in which the operations or steps are described is not intended to be construed as a limitation, and any number of the described operations may be combined in any order and/or in parallel to implement method 800.

At step 802, the process 800 may include utilizing a modular multi-reactor plant energy system (e.g., a 12-module system, a 6-module system, a 4-module system, etc.) to dynamically provide electrical and thermal energy. It is noted that utilizing a modular multi-reactor plant energy system may dynamically and flexibly controlled to provide adequate energy as necessary.

At step 804, the process 800 may include utilizing a desalination plant to process seawater into water and a concentrated Sodium Chloride (NaCl) solution. It is noted that the desalination of seawater sometimes requires pretreatment of the seawater. It is also noted that during the pretreatment of seawater, dissolved Carbon Dioxide ($CO_2$) in the seawater may be released. The released Carbon Dioxide ($CO_2$) may be routed to the DAC process.

At step 806, the process 800 may include utilizing a Chlor-Alkali process to produce Sodium Hydroxide (NaOH) (a carbon-capture solution). It is noted that processing Sodium Chloride (NaCl) to produce Sodium Hydroxide (NaOH) also produces Hydrogen ($H_2$) gas and Chlorine ($Cl_2$) gas. In an embodiment, the Hydrogen ($H_2$) gas and Chlorine ($Cl_2$) gas may be combined in an industrial process to produce Hydrochloric Acid (HCl).

At step 808, the process 800 may include utilizing a DAC process to utilize atmospheric air, specifically the Carbon Dioxide ($CO_2$) present within the atmospheric air, to interact with the Sodium Hydroxide (NaOH) capture solution and generate an aqueous sodium bicarbonate ($NaCO_3$) solution.

If it is desired for the captured Carbon Dioxide ($CO_2$) to be regenerated into Sodium Formate (HCOONa), the process 800 may continue to step 810. If it is desired for the captured Carbon Dioxide ($CO_2$) to be regenerated into Sodium Acetate ($CH_3COONa$), the method 900 may continue to step 812.

At step 810, the process 800 may include combining formic acid to the Sodium Hydroxide (NaOH) to produce Sodium Formate (HCOONa) as demonstrated in the equations 2 and 3, as discussed above with reference to FIG. 2, and reproduced below:

$$HCOOH + NaOH \longrightarrow HCOONa + H_2O, \tag{2}$$

$$2HCOOH + Na_2CO_3 \longrightarrow 2HCOONa + H_2O + CO_2, \tag{3}$$

where, in equation 2, HCOOH is formic acid being added to the carbon-dioxide capturing solution, NaOH is sodium hydroxide (the carbon-dioxide capture solution), HCOONa is sodium formate generated when the formic acid reacts with the sodium hydroxide carbon-dioxide capturing solution, and $H_2O$ is water produced, along with the Sodium Formate (HCOONa), when the formic acid reacts with the sodium hydroxide carbon-capturing solution, and where, in equation 3, HCOOH is formic acid being added to the sodium carbonate solution generated through direct air capture, $Na_2CO_3$ is the sodium carbonate generated through direct air capture, HCOONa is sodium formate created when the formic acid reacts with the Sodium Carbonate ($Na_2CO_3$), $H_2O$ is water generated, along with the Sodium Formate (HCOONa), when then formic acid reacts with the Sodium Carbonate ($Na_2CO_3$), and $CO_2$ is carbon dioxide generated, along with the Sodium Formate (HCOONa) and water, when the formic acid reacts with the Sodium Carbonate ($Na_2CO_3$).

In embodiments, utilizing step 810 may regenerate captured Carbon Dioxide ($CO_2$) for further industrial processing without the requiring a high energy demand. In embodiments, the captured Carbon Dioxide ($CO_2$) may be compressed, sequestrated, and/or re-used to generate new useful materials.

At step 812, the method 800 may include combining Acetic Acid ($CH_3COOH$) to the Sodium Hydroxide (NaOH) to produce Sodium Acetate ($CH_3COONa$), as demonstrated in the equations 7 and 8, as discussed above with reference to FIG. 2, and reproduced below:

$$CH_3COOH + NaOH \longrightarrow CH_3COONa + H_2O \tag{7}$$

$$2CH_3COOH + Na_2CO_3 \longrightarrow 2CH_3COONa + H_2O + CO_2 \tag{8}$$

where, in equation 7, $CH_3COOH$ is acetic acid being added to Sodium Carbonate ($Na_2CO_3$) for the Acetic Acid ($CH_3COOH$) treatment process, NaOH is sodium hydroxide (the carbon-dioxide capturing solution), $CH_3COONa$ is sodium acetate generated when the Acetic Acid ($CH_3COOH$) reacts with the sodium hydroxide carbon-dioxide capturing solution, and $H_2O$ is water generated, along with the Sodium Acetate ($CH_3COONa$), when the Acetic Acid ($CH_3COOH$) reacts with the sodium hydroxide carbon-dioxide capturing solution, and where, in equation 8, $CH_3COOH$ is acetic acid being added to Sodium Carbonate ($Na_2CO_3$) for the Acetic Acid ($CH_3COOH$) treatment process, $Na_2CO_3$ is sodium carbonate generated through direct air capture, $CH_3COONa$ is sodium acetate generated when the Acetic Acid ($CH_3COOH$) reacts with the Sodium Carbonate ($Na_2CO_3$), $H_2O$ is water generated, along with the Sodium Acetate ($CH_3COONa$), when the Acetic Acid ($CH_3COOH$) reacts with the Sodium Carbonate ($Na_2CO_3$), and $CO_2$ is carbon dioxide generated, along with Sodium Acetate ($CH_3COONa$) and water, when the Acetic Acid ($CH_3COOH$) reacts with the Sodium Carbonate ($Na_2CO_3$).

In embodiments, utilizing step 814 may regenerate captured Carbon Dioxide ($CO_2$) for further industrial processing without the requiring a high energy demand. In embodiments, the captured Carbon Dioxide ($CO_2$) may be compressed, sequestrated, and/or re-used to generate new useful materials.

Figure 9:
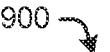
FIG. 9 is a partially schematic, partially cross-sectional view of a nuclear reactor system configured in accordance with embodiments of the present technology.
Figure 10:
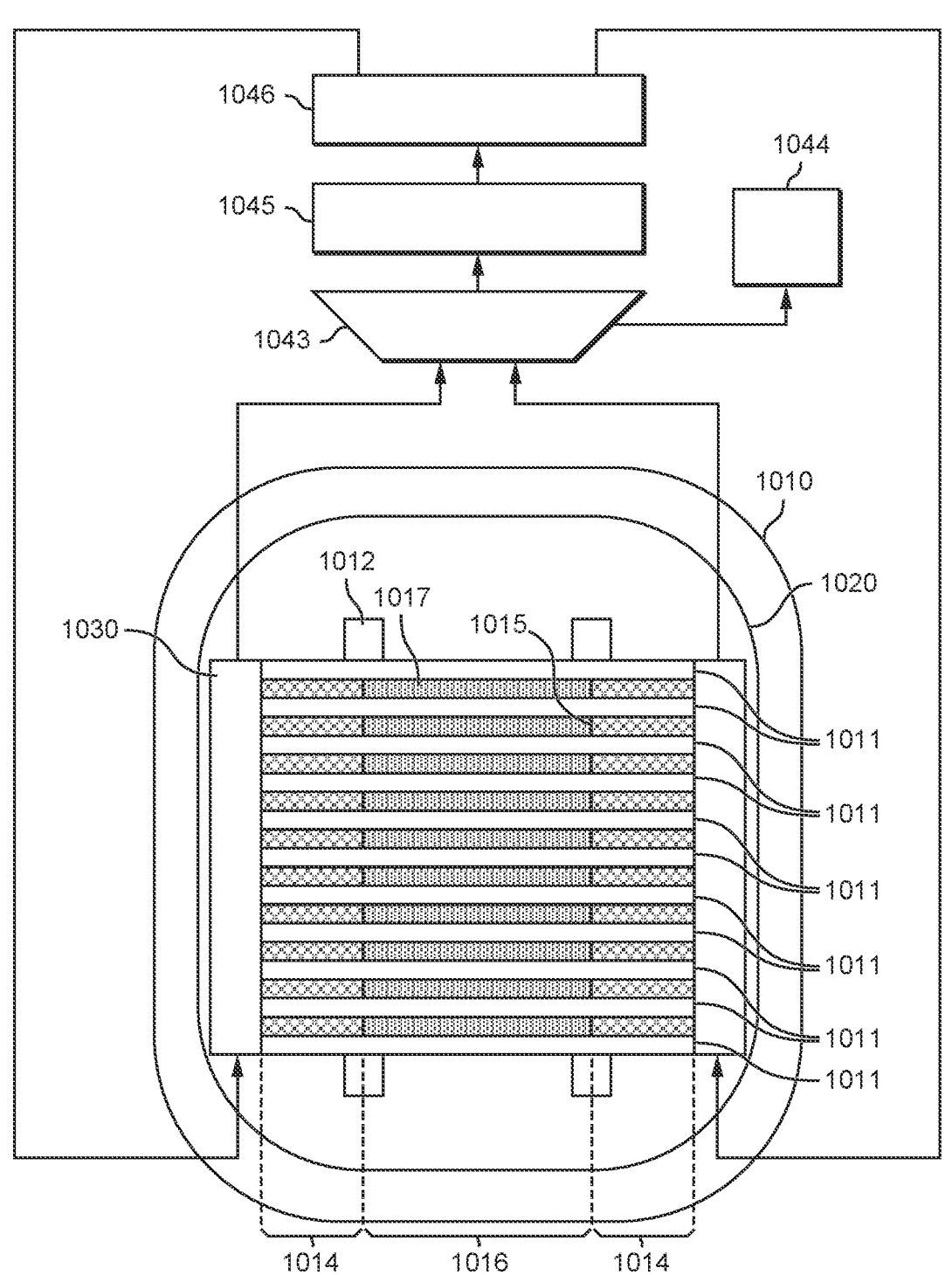
FIG. 10 is a partial schematic, partial cross-sectional view of a nuclear reactor system configured in accordance with additional embodiments of the present technology.

FIGS. 9 and 10 illustrate representative nuclear reactors that may be included in embodiments of the present technology. FIG. 9 is a partially schematic, partially cross-sectional view of a nuclear reactor system 900 configured in accordance with embodiments of the present technology. The system 900 can include a power module 902 having a reactor core 904 in which a controlled nuclear reaction takes place. Accordingly, the reactor core 904 can include one or more fuel assemblies 901. The fuel assemblies 901 can include fissile and/or other suitable materials. Heat from the reaction generates steam at a steam generator 930, which directs the steam to a power conversion system 940. The power conversion system 940 generates electrical power, and/or provides other useful outputs, such as super-heated steam. A sensor system 950 is used to monitor the operation of the power module 902 and/or other system components. The data obtained from the sensor system 950 can be used in real time to control the power module 902, and/or can be used to update the design of the power module 902 and/or other system components.

The power module 902 includes a containment vessel 910 (e.g., a radiation shield vessel, or a radiation shield container) that houses/encloses a reactor vessel 920 (e.g., a reactor pressure vessel, or a reactor pressure container), which in turn houses the reactor core 904. The containment vessel 910 can be housed in a power module bay 956. The power module bay 956 can contain a cooling pool 903 filled with water and/or another suitable cooling liquid. The bulk of the power module 902 can be positioned below a surface 905 of the cooling pool 903. Accordingly, the cooling pool 903 can operate as a thermal sink, for example, in the event of a system malfunction.

A volume between the reactor vessel 920 and the containment vessel 910 can be partially or completely evacuated to reduce heat transfer from the reactor vessel 920 to the surrounding environment (e.g., to the cooling pool 903). However, in other embodiments the volume between the reactor vessel 920 and the containment vessel 910 can be at least partially filled with a gas and/or a liquid that increases heat transfer between the reactor vessel 920 and the containment vessel 910. For example, the volume between the reactor vessel 920 and the containment vessel 910 can be at least partially filled (e.g., flooded with the primary coolant 907) during an emergency operation.

Within the reactor vessel 920, a primary coolant 907 conveys heat from the reactor core 904 to the steam generator 930. For example, as illustrated by arrows located within the reactor vessel 920, the primary coolant 907 is heated at the reactor core 904 toward the bottom of the reactor vessel 920. The heated primary coolant 907 (e.g., water with or without additives) rises from the reactor core 904 through a core shroud 906 and to a riser tube 908. The hot, buoyant primary coolant 907 continues to rise through the riser tube 908, then exits the riser tube 908 and passes downwardly through the steam generator 930. The steam generator 930 includes a multitude of conduits 932 that are arranged circumferentially around the riser tube 908, for example, in a helical pattern, as is shown schematically in FIG. 9. The descending primary coolant 907 transfers heat to a secondary coolant (e.g., water) within the conduits 932, and descends to the bottom of the reactor vessel 920 where the cycle begins again. The cycle can be driven by the changes in the buoyancy of the primary coolant 907, thus reducing or eliminating the need for pumps to move the primary coolant 907.

The steam generator 930 can include a feedwater header 931 at which the incoming secondary coolant enters the steam generator conduits 932. The secondary coolant rises through the conduits 932, converts to vapor (e.g., steam), and is collected at a steam header 933. The steam exits the steam header 933 and is directed to the power conversion system 940.

The power conversion system 940 can include one or more steam valves 942 that regulate the passage of high pressure, high temperature steam from the steam generator 930 to a steam turbine 943. The steam turbine 943 converts the thermal energy of the steam to electricity via a generator 944. The low-pressure steam exiting the turbine 943 is condensed at a condenser 945, and then directed (e.g., via a pump 946) to one or more feedwater valves 241. The feedwater valves 941 control the rate at which the feedwater re-enters the steam generator 930 via the feedwater header

931. In other embodiments, the steam from the steam generator 930 can be routed for direct use in an industrial process, such as a Hydrogen ($H_2$) and Oxygen ($O_2$) production plant, a chemical production plant, and/or the like, as described in detail below. Accordingly, steam exiting the steam generator 930 can bypass the power conversion system 940.

The power module 902 includes multiple control systems and associated sensors. For example, the power module 902 can include a hollow cylindrical reflector 909 that directs neutrons back into the reactor core 904 to further the nuclear reaction taking place therein. Control rods 913 are used to modulate the nuclear reaction and are driven via fuel rod drivers 915. The pressure within the reactor vessel 920 can be controlled via a pressurizer plate 917 (which can also serve to direct the primary coolant 907 downwardly through the steam generator 930) by controlling the pressure in a pressurizing volume 919 positioned above the pressurizer plate 917.

The sensor system 950 can include one or more sensors 951 positioned at a variety of locations within the power module 902 and/or elsewhere, for example, to identify operating parameter values and/or changes in parameter values. The data collected by the sensor system 950 can then be used to control the operation of the system 900, and/or to generate design changes for the system 900. For sensors positioned within the containment vessel 910, a sensor link 952 directs data from the sensors to a flange 953 (at which the sensor link 952 exits the containment vessel 910) and directs data to a sensor junction box 954. From there, the sensor data can be routed to one or more controllers and/or other data systems via a data bus 955.

FIG. 10 is a partially schematic, partially cross-sectional view of a nuclear reactor system 1000 configured in accordance with additional embodiments of the present technology. In some embodiments, the nuclear reactor system 1000 ("system 1000") can include some features that are at least generally similar in structure and function, or identical in structure and function, to the corresponding features of the system 1000 described in detail above with reference to FIG. 10, and can operate in a generally similar or identical manner to the system 1000.

In the illustrated embodiment, the system 1000 includes a reactor vessel 1020 and a containment vessel 1010 surrounding/enclosing the reactor vessel 1020. In some embodiments, the reactor vessel 1020 and the containment vessel 1010 can be roughly cylinder-shaped or capsule-shaped. The system 1000 further includes a plurality of heat pipe layers 1011 within the reactor vessel 1020. In the illustrated embodiment, the heat pipe layers 1011 are spaced apart from and stacked over one another. In some embodiments, the heat pipe layers 1011 can be mounted/secured to a common frame 1012, a portion of the reactor vessel 1020 (e.g., a wall thereof), and/or other suitable structures within the reactor vessel 1020. In other embodiments, the heat pipe layers 1011 can be directly stacked on top of one another such that each of the heat pipe layers 1011 supports and/or is supported by one or more of the other ones of the heat pipe layers 1011.

In the illustrated embodiment, the system 1000 further includes a shield or reflector region 1014 at least partially surrounding a core region 1016. The heat pipe layers 1011 can be circular, rectilinear, polygonal, and/or can have other shapes, such that the core region 1016 has a corresponding three-dimensional shape (e.g., cylindrical, spherical). In some embodiments, the core region 1016 is separated from the reflector region 1014 by a core barrier 1015, such as a metal wall. The core region 1016 can include one or more fuel sources, such as fissile material, for heating the heat pipe layers 1011. The reflector region 1014 can include one or more materials configured to contain/reflect products generated by burning the fuel in the core region 1016 during operation of the system 1000. For example, the reflector region 1014 can include a liquid or solid material configured to reflect neutrons and/or other fission products radially inward toward the core region 1016. In some embodiments, the reflector region 1014 can entirely surround the core region 1016. In other embodiments, the reflector region 1014 may partially surround the core region 1016. In some embodiments, the core region 1016 can include a control material 1017, such as a moderator and/or coolant. The control material 1017 can at least partially surround the heat pipe layers 1011 in the core region 1016 and can transfer heat therebetween.

In the illustrated embodiment, the system 1000 further includes at least one heat exchanger 1030 (e.g., a steam generator) positioned around the heat pipe layers 1011. The heat pipe layers 1011 can extend from the core region 1016 and at least partially into the reflector region 1014 and are thermally coupled to the heat exchanger 1030. In some embodiments, the heat exchanger 1030 can be positioned outside of or partially within the reflector region 1014. The heat pipe layers 1011 provide a heat transfer path from the core region 1016 to the heat exchanger 1030. For example, the heat pipe layers 1011 can each include an array of heat pipes that provide a heat transfer path from the core region 1016 to the heat exchanger 1030. When the system 1000 operates, the fuel in the core region 1016 can heat and vaporize a fluid within the heat pipes in the heat pipe layers 1011, and the fluid can carry the heat to the heat exchanger 1030. The heat pipes in the heat pipe layers 1011 can then return the fluid toward the core region 1016 via wicking, gravity, and/or other means to be heated and vaporized once again.

In some embodiments, the heat exchanger 1030 can be similar to the steam generator 930 of FIG. 9 and, for example, can include one or more helically-coiled tubes that wrap around the heat pipe layers 1011. The tubes of the heat exchanger 1030 can include or carry a working fluid (e.g., a coolant such as water or another fluid) that carries the heat from the heat pipe layers 1011 out of the reactor vessel 1020 and the containment vessel 1010 for use in generating electricity, steam, and/or the like. For example, in the illustrated embodiment the heat exchanger 1030 is operably coupled to a turbine 1043, a generator 1044, a condenser 1045, and a pump 1046. As the working fluid within the heat exchanger 1030 increases in temperature, the working fluid may begin to boil and vaporize. The vaporized working fluid (e.g., steam) may be used to drive the turbine 1043 to convert the thermal potential energy of the working fluid into electrical energy via the generator 1044. The condenser 1045 can condense the working fluid after it passes through the turbine 1043, and the pump 1046 can direct the working fluid back to the heat exchanger 1030 where it can begin another thermal cycle. In other embodiments, steam from the heat exchanger 1030 can be routed for direct use in an industrial process, such as an enhanced oil recovery operation described in detail below. Accordingly, steam exiting the heat exchanger 1030 can bypass the turbine 1043, the generator 1044, the condenser 1045, the pump 1046, etc.

Figure 11:
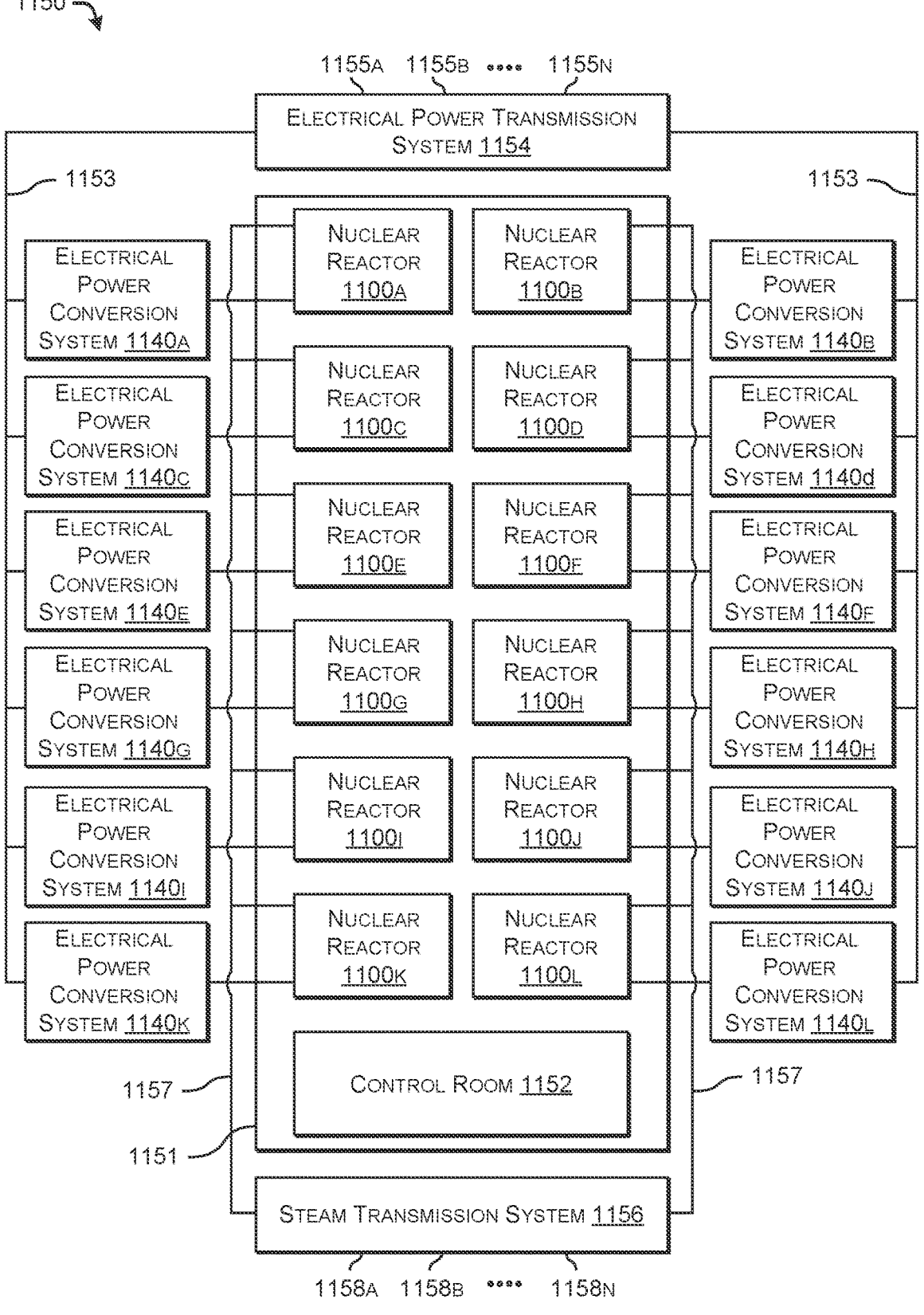
FIG. 11 is a schematic view of a nuclear power plant system including multiple nuclear reactors in accordance with embodiments of the present technology.

FIG. 11 is a schematic view of a nuclear power plant system 1150 including multiple nuclear reactors 1100 in accordance with embodiments of the present technology. Each of the nuclear reactors 1100 (individually identified as first through twelfth nuclear reactors 1100a-l, respectively)

can be similar to or identical to the nuclear reactor 1100 and/or the nuclear reactor 1100 described in detail above with reference to FIGS. 9 and 10. The power plant system 1150 ("power plant system 1150") can be "modular" in that each of the nuclear reactors 1100 can be operated separately to provide an output, such as electricity or steam. The power plant system 1150 can include fewer than twelve of the nuclear reactors 1100 (e.g., two, three, four, five, six, seven, eight, nine, ten, or eleven of the nuclear reactors 1100), or more than twelve of the nuclear reactors 1100. The power plant system 1150 can be a permanent installation or can be mobile (e.g., mounted on a truck, tractor, mobile platform, and/or the like). In the illustrated embodiment, each of the nuclear reactors 1100 can be positioned within a common housing 1151, such as a reactor plant building, and controlled and/or monitored via a control room 1152.

Each of the nuclear reactors 1100 can be coupled to a corresponding electrical power conversion system 1140 (individually identified as first through twelfth electrical power conversion systems 1140a-1, respectively). The electrical power conversion systems 1140 can include one or more devices that generate electrical power or some other form of usable power from steam generated by the nuclear reactors 1100. In some embodiments, multiple ones of the nuclear reactors 1100 can be coupled to the same one of the electrical power conversion systems 1140 and/or one or more of the nuclear reactors 1100 can be coupled to multiple ones of the electrical power conversion systems 1140 such that there is not a one-to-one correspondence between the nuclear reactors 1100 and the electrical power conversion systems 1140.

The electrical power conversion systems 1140 can be further coupled to an electrical power transmission system 1154 via, for example, an electrical power bus 1153. The electrical power transmission system 1154 and/or the electrical power bus 1153 can include one or more transmission lines, transformers, and/or the like for regulating the current, voltage, and/or other characteristic(s) of the electricity generated by the electrical power conversion systems 1140. The electrical power transmission system 454 can route electricity via a plurality of electrical output paths 1155 (individually identified as electrical output paths 1155a-n) to one or more end users and/or end uses, such as different electrical loads of an integrated energy system.

Each of the nuclear reactors 1100 can further be coupled to a steam transmission system 1156 via, for example, a steam bus 1157. The steam bus 1157 can route steam generated from the nuclear reactors 1100 to the steam transmission system 1156 which in turn can route the steam via a plurality of steam output paths 1158 (individually identified as steam output paths 1158a-n) to one or more end users and/or end uses, such as different steam inputs of an integrated energy system.

In some embodiments, the nuclear reactors 1100 can be individually controlled (e.g., via the control room 1152) to provide steam to the steam transmission system 1156 and/or steam to the corresponding one of the electrical power conversion systems 1140 to provide electricity to the electrical power transmission system 1154. In some embodiments, the nuclear reactors 1100 are configured to provide steam either to the steam bus 1157 or to the corresponding one of the electrical power conversion systems 1140 and can be rapidly and efficiently switched between providing steam to either. Accordingly, in some aspects of the present technology the nuclear reactors 1100 can be modularly and flexibly controlled such that the power plant system 1150 can provide differing levels/amounts of electricity via the electrical power transmission system 1154 and/or steam via the steam transmission system 1156. For example, where the power plant system 1150 is used to provide electricity and steam to one or more industrial process-such as various components of the integrated energy systems, the nuclear reactors 1100 can be controlled to meet the differing electricity and steam requirements of the industrial processes.

As one example, during a first operational state of an integrated energy system employing the power plant system 1150, a first subset of the nuclear reactors 1100 (e.g., the first through sixth nuclear reactors 1100*a-f*) can be configured to provide steam to the steam transmission system 1156 for use in the first operational state of the integrated energy system, while a second subset of the nuclear reactors 1100 (e.g., the seventh through twelfth nuclear reactors 1100*g*-1) can be configured to provide steam to the corresponding ones of the electrical power conversion systems 1140 (e.g., the seventh through twelfth electrical power conversion systems 1140*g*-1) to generate electricity for the first operational state of the integrated energy system. Then, during a second operational state of the integrated energy system when a different (e.g., greater or lesser) amount of steam and/or electricity is required, some or all the first subset of the nuclear reactors 1100 can be switched to provide steam to the corresponding ones of the electrical power conversion systems 1140 (e.g., the seventh through twelfth electrical power conversion systems 1140*g*-1) and/or some or all of the second subset of the nuclear reactors 1100 can be switched to provide steam to the steam transmission system 1156 to vary the amount of steam and electricity produced to match the requirements/ demands of the second operational state. Other variations of steam and electricity generation are possible based on the needs of the integrated energy system. That is, the nuclear reactors 1100 can be dynamically/flexibly controlled during other operational states of an integrated energy system to meet the steam and electricity requirements of the operational state.

In contrast, some conventional nuclear power plant systems can typically generate either steam or electricity for output and cannot be modularly controlled to provide varying levels of steam and electricity for output. Moreover, it is typically difficult (e.g., expensive, time consuming, etc.) to switch between steam generation and electricity generation in conventional nuclear power plant systems. Specifically, for example, it is typically extremely time consuming to switch between steam generation and electricity generation in prototypical large nuclear power plant systems.

The nuclear reactors 1100 can be individually controlled via one or more operators and/or via a computer system. Accordingly, many embodiments of the technology described herein may take the form of computer- or machine- or controller-executable instructions, including routines executed by a programmable computer or controller. Those skilled in the relevant art will appreciate that the technology can be practiced on computer/controller systems other than those shown and described herein. The technology can be embodied in a special-purpose computer, controller or data processor that is specifically programmed, configured, or constructed to perform one or more of the computer-executable instructions described below. Accordingly, the terms "computer" and "controller" as generally used herein refer to any data processor and can include Internet appliances and hand-held devices (including palmtop computers, wearable computers, cellular or mobile phones, multi-processor systems, processor-based or programmable consumer electronics, network computers, mini computers and the like). Information handled by these computers can be presented at any suitable display medium, including a liquid crystal display (LCD).

The technology can also be practiced in distributed environments, where tasks or modules are performed by remote processing devices that are linked through a communications network. In a distributed computing environment, program modules or subroutines may be located in local and remote memory storage devices. Aspects of the technology described herein may be stored or distributed on computer-readable media, including magnetic or optically readable or removable computer disks, as well as distributed electronically over networks. Data structures and transmissions of data particular to aspects of the technology are also encompassed within the scope of the embodiments of the technology.

The power plant system 1150 of FIG. 11 can be coupled to one or more industrial processes and/or systems to form an integrated energy system for producing industrial products such as Hydrogen ($H_2$), Oxygen ($O_2$), Nitrogen ($N_2$), Ammonia ($NH_3$), Sulfuric Acid ($H_2SO_4$), Methanol ($CH_3OH$), Urea ($NH_2CONH_2$), and/or the like while yielding carbon-free emissions. Such an integrated energy system can drastically reduce or even eliminate carbon dioxide ($CO_2$) emissions compared to conventional systems and processes for producing industrial products. In some embodiments, an integrated energy system in accordance with the present technology can produce carbon-free Hydrogen ($H_2$), Nitrogen ($N_2$), Oxygen ($O_2$), electric power, and process heat (e.g., steam) as individual commodities or as feedstock or an energy source for other systems to produce other industrial products. In some embodiments, the power plant system 1150 can flexibly deliver electric power and steam to one or more of a DAC system for producing Carbon Dioxide ($CO_2$), a high and/or low temperature electrolysis system for producing Hydrogen ($H_2$), a desalination system for producing desalinated water, a water purification system for producing clean water, a reversible solid oxide fuel cell system for producing electricity using Hydrogen ($H_2$), and/ or the like.

In some embodiments, a suitable integrated energy system for powering either of both of the above processes can include some features that are at least generally similar in structure and function, or identical in structure and function, to the corresponding features of the integrated energy systems described in detail in U.S. patent application Ser. No. 18/116,819, filed and Mar. 2, 2023, and titled "SMALL MODULAR NUCLEAR REACTOR INTEGRATED ENERGY SYSTEMS FOR ENERGY PRODUCTION AND GREEN INDUSTRIAL APPLICATIONS," which is incorporated herein by reference in its entirety.

CONCLUSION

All numeric values are herein assumed to be modified by the term about whether or not explicitly indicated. The term about, in the context of numeric values, generally refers to a range of numbers that one of skill in the art would consider equivalent to the recited value (e.g., having the same function and/or result). For example, the term about can refer to the stated value plus or minus ten percent. For example, the use of the term about 100 can refer to a range of from 90 to 110, inclusive. In instances in which the context requires otherwise and/or relative terminology is used in reference to something that does not include, or is not related to, a numerical value, the terms are given their ordinary meaning to one skilled in the art.

The above detailed description of embodiments of the present technology are not intended to be exhaustive or to limit the technology to the precise forms disclosed above. Although specific embodiments of, and examples for, the technology are described above for illustrative purposes, various equivalent modifications are possible within the scope of the technology, as those skilled in the relevant art will recognize. For example, although steps may be presented in a given order, in other embodiments, the steps may be performed in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

As used herein, the phrase and/or as in A and/or B refers to A alone, B alone, and A and B. Additionally, the term comprising is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. An integrated energy system comprising:
a power plant including at least one nuclear reactor and an electrical power generation system, the at least one nuclear reactor being configured to generate steam;
a syngas generation system operably coupled to the power plant, the syngas generation system comprising:
a first reaction chamber receiving Sodium Formate (HCOONa) that, via injection of a first portion of the steam at a first temperature, is decomposed into Sodium Oxalate $((COO)_2Na_2)$ and Hydrogen $(H_2)$, and
a second reaction chamber receiving the Sodium Oxalate $((COO)_2Na_2)$ that, via injection of a second portion of the steam at a second temperature, is decomposed into Sodium Oxide $(Na_2O)$, Carbon Monoxide (CO), and carbon dioxide, the steam including super-heated steam; and
a methanol generation system operably coupled to the syngas generation system, the methanol generation system configured to utilize a combination of the Hydrogen $(H_2)$, the Carbon Monoxide (CO), and the carbon dioxide to generate Methanol $(CH_3OH)$.

2. The integrated energy system of claim 1, wherein the methanol generation system is a synthesis chamber configured to combine the Hydrogen $(H_2)$, Carbon Monoxide (CO), and carbon dioxide to generate Methanol $(CH_3OH)$.

3. The integrated energy system of claim 1, wherein the syngas generation system is further configured to generate Hydrogen $(H_2)$, Carbon Monoxide (CO), and carbon dioxide by processing plastic waste.

4. The integrated energy system of claim 1, wherein the syngas generation system utilizes a sodium formate generation system, wherein the sodium formate generation system includes seawater desalination, a Chlor-Alkali Membrane process, a direct air capture process, and a formic acid treatment process.

5. A system for Carbon Dioxide $(CO_2)$ production, the system comprising:
a small modular nuclear reactor (SMR) power plant system configured to supply steam;
a first reaction chamber configured to receive Sodium Formate (HCOONa), receive, from the SMR power plant system, a first portion of the steam at a first temperature, and supply Sodium Oxalate $((COO)_2Na_2)$ and Hydrogen $(H_2)$; and
a second reaction chamber configured to receive the Sodium Oxalate $((COO)_2Na_2)$, receive, from the SMR power plant system, a second portion of the steam at a second temperature, and supply Sodium Oxide $(Na_2O)$; Carbon Monoxide (CO); and Carbon Dioxide $(CO_2)$.

6. The system of claim 5, further comprising:
a synthesis chamber configured to receive, from the first reaction chamber, Hydrogen $(H_2)$, receive, from the second reaction chamber, the Carbon Monoxide (CO), the Carbon Dioxide $(CO_2)$, and receive a catalyst to induce catalysis for Methanol $(CH_3OH)$ production.

7. The system of claim 5, wherein the first portion of the steam comprises super-heated steam with the first temperature being within a range of between 300° C.-350° C.

8. The system of claim 5, wherein the second portion of the steam comprises super-heated steam with the second temperature being at least 800° C.

9. The system of claim 5, wherein the SMR power plant system is further configured to supply a third portion of the steam at a third temperature within a range of 200° C.-300° C., further comprising,
a synthesis chamber configured to receive the Hydrogen $(H_2)$, the Carbon Monoxide (CO), the Carbon Dioxide $(CO_2)$, and a catalyst to induce catalysis for Methanol $(CH_3OH)$ production.

10. The system of claim 6, wherein the first reaction chamber includes a first rotating spiral, the second reaction chamber includes a second rotating spiral, and the first reaction chamber is separated from the second reaction chamber by an airtight chamber.

11. The system of claim 6, further wherein:
the synthesis chamber configured to produce:
one mole of first Methanol $(CH_3OH)$ produced by a reaction between one mole of the carbon dioxide and three moles of the Hydrogen $(H_2)$;
one mole of water produced by a reaction between one mole of the Carbon Dioxide $(CO_2)$ and three moles of the Hydrogen $(H_2)$;
one mole of Carbon Dioxide $(CO_2)$ produced by a reaction between one mole of the Carbon Monoxide (CO) and one mole of the water;
one mole of second Hydrogen $(H_2)$ produced by a reaction between one mole of the Carbon Monoxide (CO) and one mole of the water; and one mole of second Methanol (CH$_3$OH) produced by a reaction between one mole of the Carbon Dioxide (CO$_2$) and two moles of the Hydrogen (H$_2$).

12. The system of claim 6, wherein the first reaction chamber, the second reaction chamber, and the synthesis chamber are located on a same production site as the small modular nuclear reactor power plant.

* * * * *